(12) United States Patent
Chernikov et al.

(10) Patent No.: US 6,539,368 B1
(45) Date of Patent: Mar. 25, 2003

(54) NEURAL PROCESSOR, SATURATION UNIT, CALCULATION UNIT AND ADDER CIRCUIT

(75) Inventors: Vladimir Mikhailovich Chernikov, Moscow (RU); Pavel Evgenjevich Viksne, Moscow (RU); Dmitriy Viktorovich Fomin, Moscow (RU); Pavel Aleksandrovich Shevchenko, Moscow (RU); Mikhail Fedorovich Yafrakov, Moscow (RU)

(73) Assignee: Joint-Stock Company Research Centre "Module", Moscow (RU)

( * ) Notice: Subject to any disclaimer, the term of this patent is extended or adjusted under 35 U.S.C. 154(b) by 0 days.

(21) Appl. No.: 09/486,495

(22) PCT Filed: Dec. 31, 1998

(86) PCT No.: PCT/RU98/00449

§ 371 (c)(1),
(2), (4) Date: Feb. 28, 2000

(87) PCT Pub. No.: WO99/66419

PCT Pub. Date: Dec. 23, 1999

(30) Foreign Application Priority Data

Jun. 16, 1998 (RU) ............................................ 98110876

(51) Int. Cl.[7] .............................................. G06F 15/18
(52) U.S. Cl. ........................................ 706/41; 706/34
(58) Field of Search ..................................... 706/41, 34

(56) References Cited

U.S. PATENT DOCUMENTS

| | | | |
|---|---|---|---|
| 4,675,837 A | 6/1987 | Ulbrich et al. | 708/714 |
| 4,825,401 A | 4/1989 | Ikumi | 708/630 |
| 5,047,975 A | 9/1991 | Pattia et al. | 708/706 |
| 5,142,666 A * | 8/1992 | Yoshizawa et al. | 706/38 |
| 5,278,945 A | 1/1994 | Basehove et al. | 706/41 |
| 5,644,519 A | 7/1997 | Yatim et al. | 708/523 |

FOREIGN PATENT DOCUMENTS

| | | |
|---|---|---|
| EP | 0253475 | 1/1988 |
| EP | 0309348 | 3/1989 |
| EP | 0318075 | 5/1989 |
| RU | 2022339 | 10/1994 |
| RU | 2074414 | 2/1997 |
| RU | 2097826 | 11/1997 |
| SU | 690477 | 10/1979 |
| WO | WO 97/29437 | 8/1997 |

OTHER PUBLICATIONS

A. A. Papernov, Logical basis for a digital calculating technology; Sovietskoe Radio, 1972, pp. 156–157.

Y.P.Ivanov et al., "Principal Directions of Hardware Development of Neural Network Algorithms Implementation", Thesis of Reports of the Second Russian Conference <<Neural Computers And Their Application>>, Moscow, Feb. 14, 1996) // Neurocomputer.—1996.—No. 1,2.—pp. 47–49.

* cited by examiner

Primary Examiner—George B. Davis
(74) Attorney, Agent, or Firm—Kenyon & Kenyon

(57) ABSTRACT

The present invention relates to the field of computer science and can be used for neural network emulation and digital signal processing. Increasing of the neural processor performance is achieved using the ability to change word lengths of results in program mode. The neural processor includes six registers, a shift register, a AND gate, two FIFOs, a switch, a multiplexer, two saturation units, a calculation unit and a adder circuit to execute operations over vectors of programmable word length data. Increasing of the saturation unit performance is achieved using the ability to process vector of input operands with programmable word length at a time. Increasing of the adder circuit performance is achieved using ability to sum two vectors of input operands of programmable word lengths.

8 Claims, 6 Drawing Sheets

NEURAL PROCESSOR, SATURATION UNIT, CALCULATION UNIT AND ADDER CIRCUIT

FIELD OF THE INVENTION

The present invention relates to the field of computer science and can be used for neural network emulation and real-time digital signal processing.

BACKGROUND INFORMATION

Network Algorithms Implementation/Y. P. Ivanov and others (Theses of reports of the Second Russian Conference <<Neural Computers And Their Application)>>, Moscow, Feb. 14, 1996) //Neurocomputer.—1996.—No.1,2.— pp.47–49], comprising an input data register and four neural units, each of them consists of a shift register, a weight coefficient register, eight multipliers, a multi-operand summation circuit and a block for the threshold function calculation.

Such neural processor executes weighted summation of fixed amount of input data for a fixed number of neurons in each clock cycle irrespective of the real range of input data values and their weight coefficients. In this case every input data as well as every weight coefficient are presented in the form of an operand with a fixed word length, determined by the bit length of the neural processor hardware units.

The closest one is neural processor [U.S. Pat. No. 5,278, 945, U.S. Cl. 395/27, 1994], comprising three registers, a multiplexer, a FIFO, a calculation unit to compute dot product of two vectors of programmable word length data with the addition of accumulated result and a nonlinear unit.

Input data vectors and their weight coefficients are applied to the inputs of such neural processor. In each clock cycle the neural processor performs weighted summation of several input data for one neuron by means of calculation the dot product of the input data vector by the weight coefficient vector. In addition the neural processor supports processing of vectors, which word length of separate elements may be selected from set of fixed values in program mode. With decreasing the word length of input data and weight coefficients their number in each vector increases and thus the neural processor performance improves. However, the word length of the obtained results is fixed and determined by the bit length of the neural processor hardware units.

A digital unit for saturation with saturation region, determined by absolute value of a number, is known [SU, No. 690477, Int. Cl. G 06 F 7/38, 1979], comprising three registers, an adder, two code converters, two sign analyzing blocks, a correction block, two groups of AND gates and a group of OR gates. Such unit allows to calculate saturation functions for a vector with N input operands per 2N clock cycles.

The closest one is saturation unit [U.S. Pat. No. 5,644, 519, U.S. Cl. 364/736.02, 1997], comprising a multiplexer, a comparator and two indicators of the saturation. Such unit allows to calculate saturation functions for a vector with N input operands per N cycles.

A calculation unit is known [U.S. Pat. No. 5,278,945, U.S. Cl. 395/27,1994], comprising multipliers, adders, registers, a multiplexer and a FIFO. Said unit allows to calculate dot product of two vectors, which contains M operands each, per one clock cycle and to multiply of a matrix containing N×M operands by a vector consisting of M operands per N cycles.

The closest one is calculation unit [U.S. Pat. No 4,825, 401, U.S. Cl. 364/760, 1989], comprising 3N/2 AND gates, N/2 decoders for decoding a multiplier on the basis of Booth's algorithm, a cell array of N columns by N/2 cells for multiplication, where each cell consists of a circuit to generate one bit of partial product on the basis of Booth's algorithm and of a one-bit adder, a 2N-bit adder, N/2 multiplexers, N/2 additional circuits to generate one bit of partial product on the basis of Booth's algorithm and N/2 implicators. Said unit allows to multiply two N-bit operands or to multiply element-by-element two vectors of two (N/2)-bit operands each per one clock cycle.

A unit for summation of vectors with programmable word length operands is known [U.S. Pat. No. 5,047,975, U.S. Cl. 364/786, 1991], comprising adders and AND gates with inverted input.

The closest one is adder [U.S. Pat. No. 4,675,837, U.S. Cl. 364/788, 1987], comprising a carry logic and in its every bit—a half-adder and an EXCLUSIVE OR gate. Said adder allows to add two vectors of N operands each per N cycles.

SUMMARY OF THE INVENTION

The neural processor comprises first, second, third, fourth, fifth and sixth registers, a shift register, an AND gate, first and second FIFOs, first and second saturation units, a calculation unit, incorporating inputs of first operand vector bits, inputs of second operand vector bits, inputs of third operand vector bits, inputs of data boundaries setting for first operand vectors and result vectors, inputs of data boundaries setting for second operand vectors, inputs of data boundaries setting for third operand vectors, first and second inputs of load control of third operand vectors into the first memory block, input of reload control of third operand matrix from the first memory block to the second memory block and outputs of bits of first and second summand vectors of results of the addition of first operand vector and product of the multiplication of second operand vector by third operand matrix, stored into the second memory block, an adder circuit, a switch from 3 to 2 and a multiplexer, and first data inputs of bits of the switch from 3 to 2, data inputs of the first FIFO, of first, second, third and fourth registers and parallel data inputs of the shift register are bit-by-bit coupled and connected to respective bits of first input bus of the neural processor, which each bit of second input bus is connected to second data input of the respective bit of the switch from 3 to 2, which first output of each bit is connected to input of the respective bit of input operand vector of the first saturation unit, which control input of every bit is connected to output of the corresponding bit of the second register, second output of each bit of the switch from 3 to 2 is connected to input of the respective bit of input operand vector of the second saturation unit, which control input of each bit is connected to output of respective bit of the third register, output of each bit of the first register is connected to first data input of the respective bit of the multiplexer, which second data input of each bit is connected to output of the respective bit of result vector of the first saturation unit, output of each bit of the multiplexer is connected to input of the respective bit of first operand vector of the calculation unit, which input of each bit of second operand vector is connected to output of the respective bit of result vector of the second saturation unit, data outputs of the first FIFO are connected to inputs of the respective bits of third operand vector of the calculation unit, which output of each bit of first summand vector of results of the addition of first operand vector and product of the multiplication of second operand vector by third operand matrix, stored into the second memory block, is connected to input of respective bit of first summand vector of the adder circuit, which input of each bit of second summand vector is connected to output of respective bit of second summand vector of results of the addition of first operand vector and product of the multiplication of second operand vector by third operand matrix, stored into the second memory block of the calculation unit, which each input of data boundaries setting for first operand vectors and result vectors is connected to output of the respective bit of the fifth register and to the respective input of data boundaries setting for summand vectors and sum vectors of the adder circuit, which output of each bit of sum vector is connected to respective data input of the second FIFO, which each data output is connected to the respective bit of output bus of the neural processor and to third input of the respective bit of the switch from 3 to 2, output of each bit of the fourth register is connected to data input of the respective bit of the fifth register and to the respective input of data boundaries setting for third operand vectors of the calculation unit, which each input of data boundaries setting for second operand vectors is connected to output of the respective bit of the sixth register, which data input of each bit is connected to output of the respective bit of the shift register, which sequential data input and output are coupled and connected to first input of load control of third operand vectors into the first memory block of the calculation unit and to first input of the AND gate, which output is connected to read control input of the first FIFO, second input of the AND gate, shift control input of the shift register and second input of load control of third operand vectors into the first memory block of the calculation unit are coupled and connected to respective control input of the neural processor, input of reload control of third operand matrix from the first memory block to the second memory block of the calculation unit and control inputs of fifth and sixth registers are coupled and connected to the respective control input of the neural processor, control inputs of the switch from 3 to 2, of the multiplexer and of first, second, third and fourth register, write control inputs of the shift register and of the first FIFO and read and write control inputs of the second FIFO are respective control inputs of the neural processor, state outputs of first and second FIFOs are state outputs of the neural processor.

The neural processor may include a calculation unit, comprising a shift register, performed the arithmetic shift of J bits left on all N-bit vector operands, stored in it, where J-minimal value that is the aliquot part of data word lengths in second operand vectors of the calculation unit, a delay element, a first memory block, containing sequential input port and N/J cells to store N-bit data, a second memory block, containing N/J cells to store N-bit data, N/J multiplier blocks, each of that multiply N-bit vector of programmable word length data by J-bit multiplier, and a vector adding circuit, generated partial product of the summation of N/J+1 programmable word length data vectors, and inputs of third operand vector bits of the calculation unit are connected to data inputs of the shift register, which outputs are connected to data inputs of the first memory block, which outputs of each cell are connected to data inputs of the respective cell of the second memory block, which outputs of each cell are connected to inputs of multiplicand vector bits of the respective multiplier block, which inputs of the multiplier bits are connected to inputs of the respective J-bit group of second operand vector bits of the calculation unit, outputs of each multiplier block are connected to inputs of bits of the respective summand vector of the vector adding circuit, which inputs of (N/J+1)-th summand vector bits are connected to inputs of first operand vector bits of the calculation unit, which inputs of data boundaries setting for third operand vectors are connected to respective inputs of data boundaries setting for operand vectors of the shift register, which mode select input is connected to first input of load control of third operand vectors into the first memory block of the calculation unit, which second input of load control of third operand vectors into the first memory block is connected to clock input of the shift register and to input of the delay element, which output is connected to write control input of the first memory block, write control input of the second memory block is connected to input of reload control of third operand matrix from the first memory block to the second memory block of the calculation unit, which every input of data boundaries setting for second operand vectors is connected to input of the sign correction of the respective multiplier block, inputs of data boundaries setting for first operand vectors and for result vectors of the calculation unit are connected to inputs of data boundaries setting for multiplicand vectors and for result vectors of each multiplier block and to inputs of data boundaries setting for summand vectors and result vectors of the vector adding circuit, which outputs of bits of first and second summand vectors of results are respective outputs of the calculation unit.

In the described above neural processor each saturation unit may comprise an input data register, which data inputs are inputs of respective bits of input operand vector of said unit, the calculation unit may comprise an input data register, which data inputs are inputs of respective bits of first and second operand vectors of the calculation unit, the adder circuit may comprise an input data register, which data inputs are inputs of respective inputs of the adder circuit.

The saturation unit comprises a carry propagation circuit and a carry look-ahead circuit, and each of N bits of said unit comprises first and second multiplexers and an EXCLUSIVE OR gate, an EQUIVALENCE gate, a NAND gate and an AND gate with inverted input, and second data inputs of the first and the second multiplexers and first input of the EXCLUSIVE OR gate of each bit of said unit are coupled and connected to input of the respective bit of input operand vector of said unit, which output of each bit of result vector is connected to output of the first multiplexer of the respective bit of said unit, non inverted input of the AND gate with inverted input and fist inputs of the NAND gate and the EQUIVALENCE gate of each bit of said unit are coupled and connected to the respective control input of said unit, first input of the EXCLUSIVE OR gate and non inverted input of the AND gate with inverted input of q-th bit of said unit are respectively connected to second input of the EXCLUSIVE OR gate and to inverted input of the AND gate with inverted input of (q−1)-th bit of said unit, first data input of the second multiplexer of which is connected to output of the carry to (N−q+2)-th bit of the carry propagation circuit (where q=2, 3, . . . , N), output of the NAND gate of n-th bit of said unit is connected to input of carry propagation through (N−n+1)-th bit of the carry look-ahead circuit, which output of the carry to (N−n+2)-th bit is connected to control input of the first multiplexer of n-th bit of said unit, output of the AND gate with inverted input of which is connected to control input of the second multiplexer of the same bit of said unit, to carry generation input of (N−n+1)-th bit of the carry look-ahead circuit and to inverted input of the carry propagation through (N−n+1)-th bit of the carry propagation circuit, which carry input from (N−n+1)-th bit is connected to output of the second multiplexer of n-th bit of said unit (where n=1,2, . . . , N), initial carry inputs of the carry propagation circuit and of the carry look-ahead circuit, second input of the EXCLUSIVE OR gate, inverted input of the AND gate with inverted input and first data input of the second multiplexer of N-th bit of said unit are coupled and connected to "0", and in each bit of said unit output of the second multiplexer is connected to second input of the EQUIVALENCE gate, which output is connected to first data input of the first multiplexer, and output of the EXCLUSIVE OR gate is connected to second input of the NAND gate of the same bit of said unit.

In particular cases of the saturation unit usage, when there are hard demands to minimize hardware expenses, output of the carry to q-th bit is connected to carry input from (q−1)-th bit in the carry propagation circuit (where q=1,2, ..., N), and the carry look-ahead circuit comprises AND gates and OR gates of quantity of N both, and each input of the carry propagation through the respective bit of the carry look-ahead circuit is connected to first input of the respective AND gate, which output is connected to first input of the respective OR gate, which second input and output are respectively connected to carry generation input of the respective bit of the carry look-ahead circuit and to output of the carry to the same bit of the carry look-ahead circuit, second input of the first AND gate is initial carry input of the carry look-ahead circuit, second input of q-th AND gate is connected to output of (q−1)-th OR gate (where q=2,3, ..., N).

The calculation unit comprises N/2 decoders of multiplier bits, N/2 AND gates with inverted input, a delay element, a N-bit shift register, which each bit consists of an AND gate with inverted inputs, a multiplexer and a trigger, and a multiplier array of N columns by N/2 cells, each of them consists of an AND gate with inverted input, an one-bit partial product generation circuit, an one-bit adder, a multiplexer, first and second triggers, functioned us memory cells of respectively first and second memory blocks of said unit, and input of each bit of first operand vector of said unit is connected to second input of the one-bit adder of the first cell of the respective column of the multiplier array, first input of the one-bit adder of each cell of which is connected to output of the one-bit partial product generation circuit of the same cell of the multiplier array, control inputs of multiplexers and inverted inputs of the AND gates with inverted input of all cells of each column of which are coupled and connected to respective input of data boundaries setting for first operand vectors and for result vectors of said unit, which each input of data boundaries setting for second operand vectors is connected to inverted input of the respective AND gate with inverted input, which output is connected to first input of the respective decoder of multiplier bits, respective control inputs of the one-bit partial product generation circuits of i-th cells of all columns of the multiplier array are coupled and connected to respective outputs of i-th decoder of multiplier bits, second and third inputs of which are connected to inputs of respectively (2i−1)-th and (2i)-th bits of second operand vector of said unit (where i=1,2, ..., N/2), non inverted input of j-th AND gate with inverted input is connected to third input of (j−1)-th decoder of multiplier bits (where j=2, 3, ..., N/2), input of each bit of third operand vector of said unit is connected to second data input of the multiplexer of the respective bit of the shift register, which first data input is connected to output of the AND gate with inverted inputs of the same bit of the shift register, which first inverted input is connected to respective input of data boundaries setting for third operand vectors of said unit, second inverted input of the AND gate with inverted inputs of q-th bit of the shift register is connected to first inverted input of the AND gate with inverted inputs of (q−1)-th bit of the shift register (where q=2, 3, ..., N), non inverted input of AND gate with inverted inputs of r-th bit of the shift register is connected to trigger output of (r−2)-th bit of the shift register (where r=3, 4, ..., N), control inputs of multiplexers of all shift register bits are coupled and connected to first input of load control of third operand vectors into the first memory block of said unit, clock inputs of triggers of all shift register bits and input of the delay element are coupled and connected to second input of load control of third operand vectors into the first memory block, output of the multiplexer of each shift register bit is connected to data input of the trigger of the same bit of the shift register, which output is connected to data input of the first trigger of the last cell of the respective column of the multiplier array, output of the first trigger of j-th cell of each multiplier array column is connected to data input of the first trigger of (j−1)-th cell of the same multiplier array column (where j=2, 3, ..., N/2), clock inputs of the first triggers of all multiplier array cells are coupled and connected to output of the delay element, clock inputs of the second triggers of all multiplier array cells are coupled and connected to input of reload control of third operand matrix from the first memory block to the second memory block, second data input of the one-bit partial product generation circuit of i-th cell of q-th multiplier array column is connected to output of the AND gate with inverted input of i-th cell of (q−1)-th multiplier array column (where i=1, 2, ..., N/2 and q=2, 3, ..., N), second input of the one-bit adder of j-th cell of each multiplier array column is connected to sum output of the one-bit adder of the (j−1)-th cell of the same multiplier array column (where j=2, 3, ..., N/2), third input of the one-bit adder of j-th cell of q-th multiplier array column is connected to output of the multiplexer of (j−1)-th cell of (q−1)-th multiplier array column (where j=2, 3, ..., N/2 and q=2, 3, ..., N), third input of the one-bit adder of j-th cell of the first multiplier array column is connected to third output of (j−1)-th decoder of multiplier bits (where j=2, 3, ..., N/2), sum output of the one-bit adder of the last cell of each multiplier array column is output of the respective bit of first summand vector of results of said unit, output of the multiplexer of the last cell of (q−1)-th multiplier array column is output of q-th bit of second summand vector of results of said unit (where q=2, 3, ..., N), which first bit of second summand vector of results is connected to third output of (N/2)-th decoder of multiplier bits, second inverted and non inverted inputs of the AND gate with inverted inputs of the first bit and non inverted input of the AND gate with inverted inputs of the second bit of the shift register, second data inputs of the one-bit partial product generation circuits of all cells of the first column of the multiplier array, third inputs of one-bit adders of first cells of all multiplier array columns and non inverted input of the first AND gate with inverted input are coupled and connected to "0", and in each multiplier array cell the output of the first trigger is connected to data input of the second trigger, which output is connected to non inverted input of the AND gate with inverted input and to first data input of the one-bit partial product generation circuit, which third control input is connected to second data input of the multiplexer, which first data input is connected to carry output of the one-bit adder of the same cell of the multiplier array.

The adder circuit comprises a carry look-ahead circuit, and in each of N its bits—a half—adder, an EXCLUSIVE OR gate, first and second AND gates with inverted input, and input of each bit of first summand vector of the adder circuit and input of respective bit of second summand vector of the adder circuit are connected respectively to first and second inputs of the half-adder of respective bit of the adder circuit, inverted inputs of first and second AND gates with inverted input of each bit of the adder circuit are coupled and connected to respective input of data boundaries setting for summand vectors and sum vectors, output of the EXCLUSIVE OR gate of each bit of which is output of the respective bit of sum vector of the adder circuit, output of the first AND gate with inverted input of each bit of the adder circuit is connected to carry propagation input through the respective bit of the carry look-ahead circuit, which carry generation input of each bit is connected to output of the second AND gate with inverted input of the respective bit of the adder circuit, second input of the EXCLUSIVE OR gate of q-th bit of the adder circuit is connected to output of the carry to q-th bit of the carry look-ahead circuit (where q=2, 3, . . . , N), which initial carry input and second input of the EXCLUSIVE OR gate of the first bit of the adder circuit are connected to "0", and in each bit of the adder circuit sum output of the half-adder is connected to first input of the EXCLUSIVE OR gate and to non inverted input of the first AND gate with inverted input, and carry output of the half-adder is connected to non inverted input of the second AND gate with inverted input of the same bit of the adder circuit.

DETAILED DESCRIPTIONS

Figure 1:
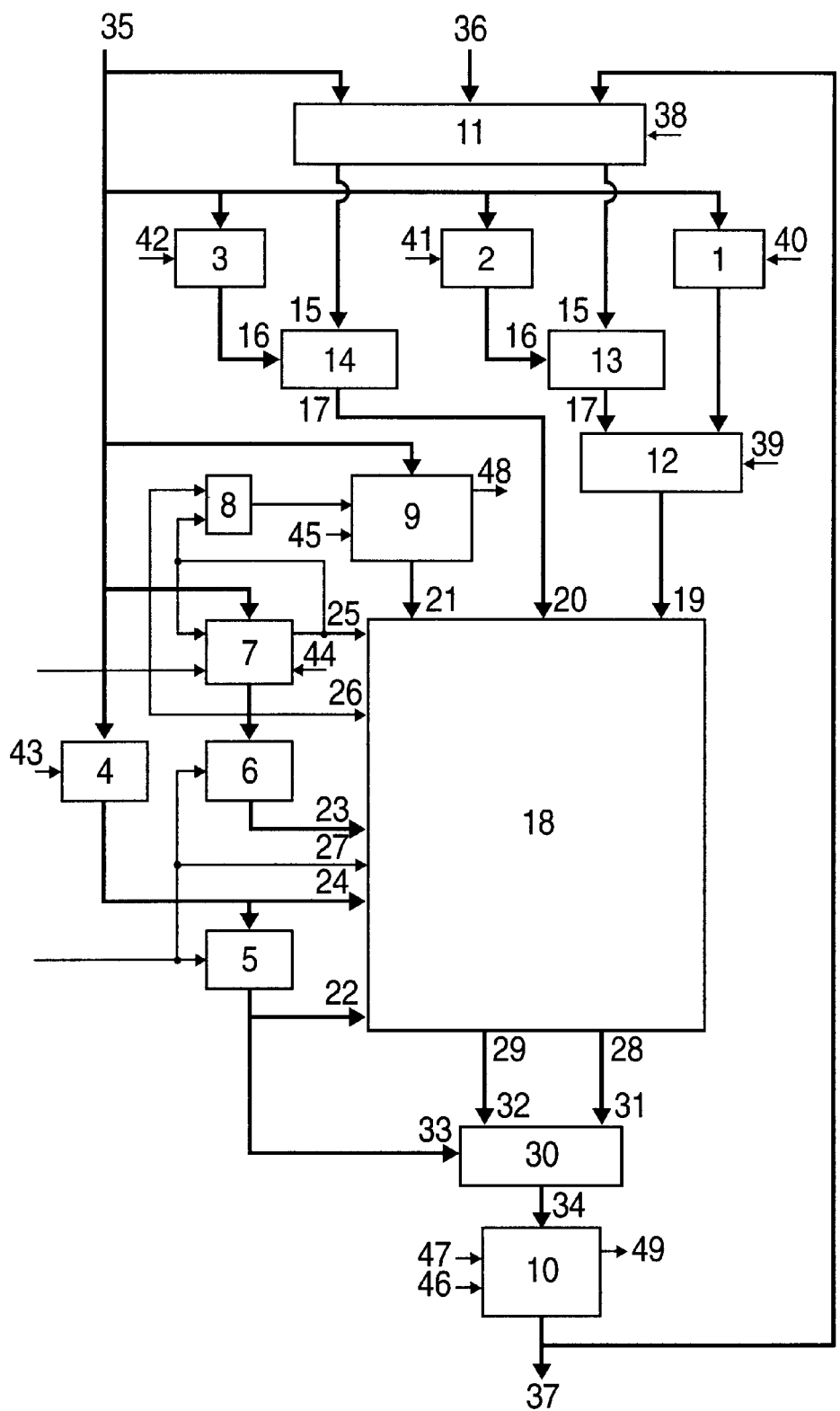
FIG. 1 shows a block diagram of a neural processor.

The neural processor, which block diagram is presented in FIG. 1, comprises first 1, second 2, third 3, fourth 4, fifth 5 and sixth 6 registers, a shift register 7, a AND gate 8, first 9 and second 10 FIFOs, a switch from 3 to 2 11, a multiplexer 12, first 13 and second 14 saturation units, each of them has inputs of bits of input operand vector 15, control inputs 16 and outputs of bits of result vector 17, a calculation unit 18, comprising inputs of bits of first 19, of second 20 and of third 21 operand vector, inputs of data boundaries setting for first operand vectors and result vectors 22, for second operand vectors 23 and for third operand vectors 24, first 25 and second 26 inputs of load control of third operand vectors into the first memory block, input of reload control of third operand matrix from the first memory block to the second memory block 27 and outputs of bits of first 28 and second 29 summand vectors of results of the addition of first operand vector and product of the multiplication of second operand vector by third operand matrix, stored into the second memory block, and an adder circuit 30, comprising inputs of bits of first 31 and second 32 summand vectors, inputs of data boundaries setting for summand vectors and sum vectors 33 and outputs of bits of sum vector 34. The neural processor has first 35 and second 36 input buses and output bus 37. Control inputs 38 of the switch from 3 to 2 11, control input 39 of the multiplexer 12, control input 40 of the first register 1, control input 41 of the second register 2, control input 42 of the third register 3, control input 43 of the fourth register, write control input 44 of the shift register 7, write control input 45 of the first FIFO 9, write 46 and read 47 control inputs of the second FIFO 10 and described above control inputs 26 and 27 of the calculation unit 18 are respective control inputs of the neural processor. State outputs 48 of the first FIFO 9 and state outputs 49 of second FIFO 10 are state outputs of the neural processor.

Figure 2:
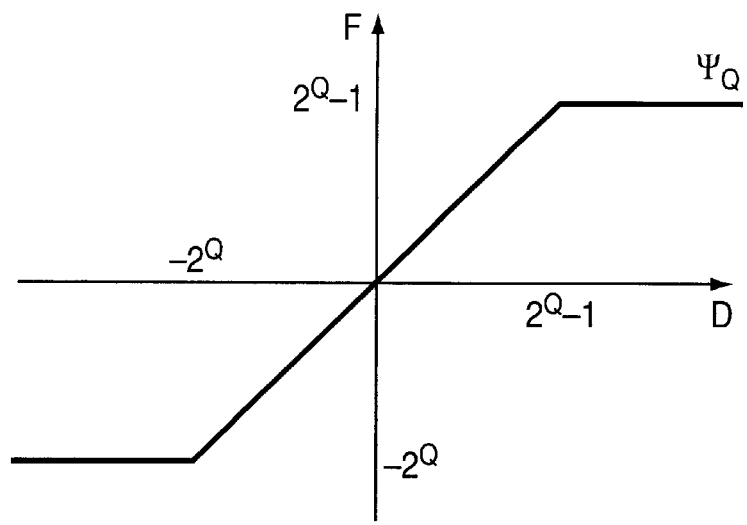
FIG. 2 shows a function of a saturation unit.

The general view of the saturation function, implemented by the neural processor, is presented in FIG. 2.

Figure 3:
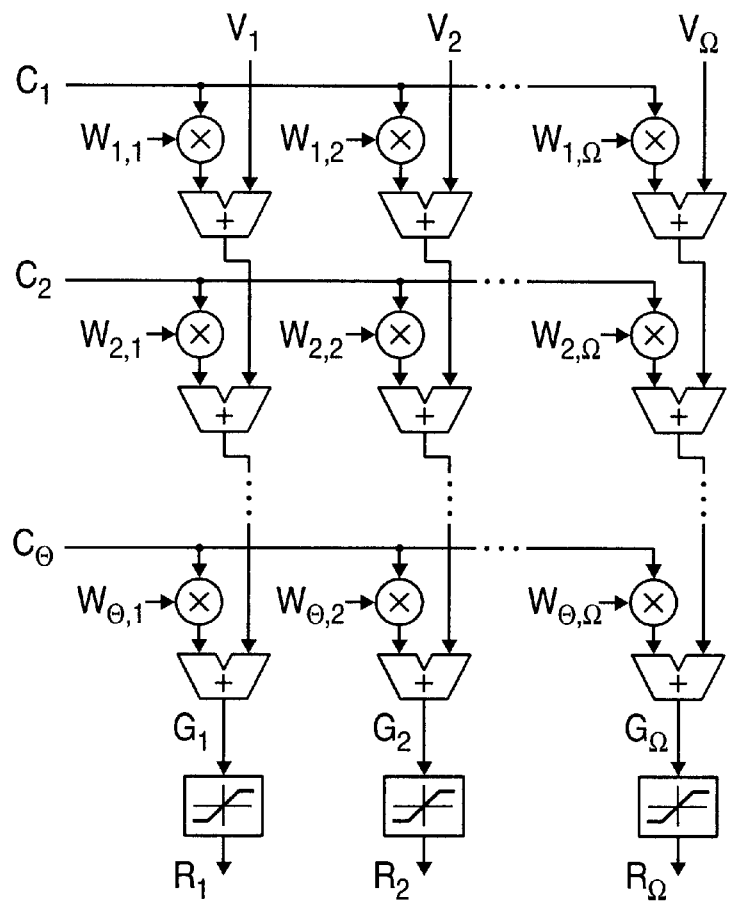
FIG. 3 shows a model of a neural network layer which is emulated by the neural processor.

A model of a neural network layer, implemented by the neural processor, is presented in FIG. 3.

Figure 4:
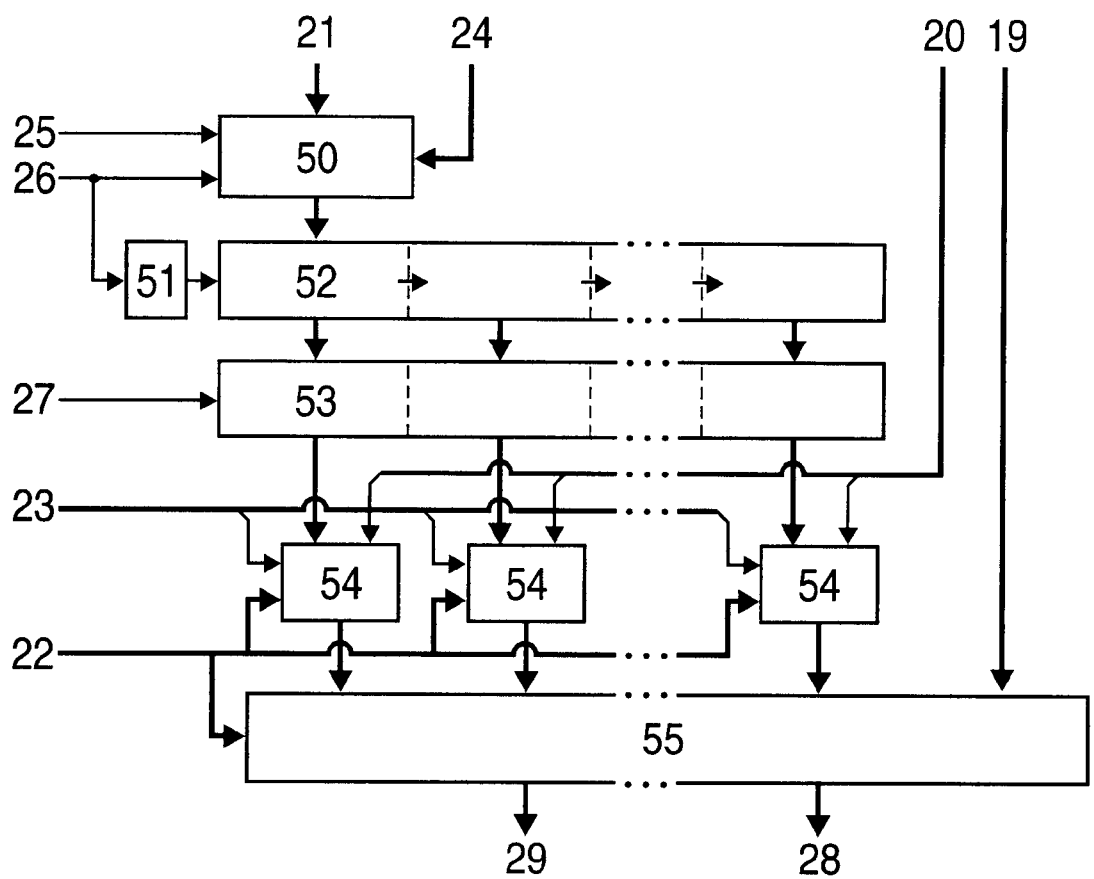
FIG. 4 shows a block diagram of a calculation unit.

FIG. 4 discloses a block diagram of one of possible implementations of the calculation unit 18 for execution of operations over vectors of programmable word length data, comprising a shift register 50, performed the arithmetic shift of J bits left on all N-bit vector operands, stored in it, where J-minimal value that is the aliquot part of data word lengths in second operand vectors of the calculation unit 18, a delay element 51, a first memory block 52, containing sequential input port and N/J cells to store N-bit data, a second memory block 53, containing N/J cells to store N-bit data, N/J multiplier blocks 54, each of that multiply N-bit vector of programmable word length data by J-bit multiplier, and a vector adding circuit 55 generated partial product of the summation of N/J+1 programmable word length data vectors.

Figure 5:
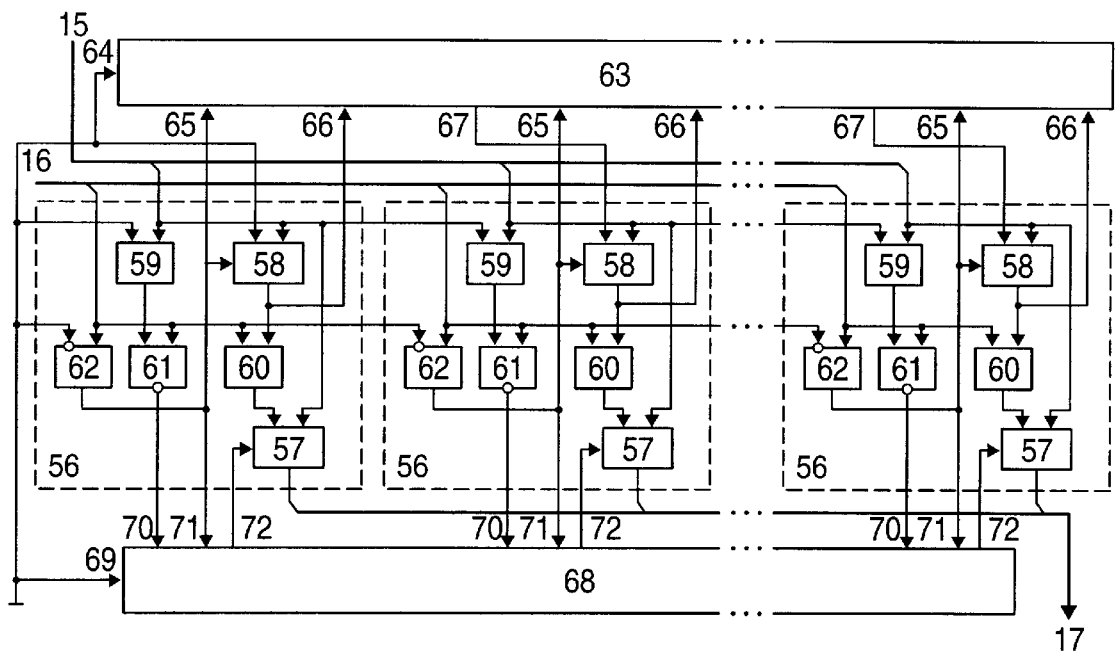
FIG. 5 shows a block diagram of the saturation unit of vectors of programmable word length data.

The saturation unit, which block diagram is presented in FIG. 5, has inputs of input operand vector 15 bits, control inputs 16 and outputs of result vector 17 bits. Each of N bits 56 of said unit comprises first 57 and second 58 multiplexers, an EXCLUSIVE OR gate 59, an EQUIVALENCE gate 60, a NAND gate 61 and an AND gate with inverted input 66. Said unit includes also a carry propagation circuit 63, comprising a initial carry input 64, inverted inputs of the carry propagation through separate bits 65, carry inputs from separate bits 66 and outputs of the carry to separate bits 67, and a carry look-ahead circuit 68, comprising a initial carry input 69, inputs of the carry propagation through separate bits 70, carry generation inputs of separate bits 71 and outputs of the carry to separate bits 72.

As circuits 63 and 68 in the saturation unit various carry propagation circuits and carry look-ahead circuits, applied in parallel adders, may be used.

In the simplest variant of carry propagation circuit 63 implementation output of the carry to q-th bit 67 is connected to carry input from (q−1)-th bit 66 (where q=1,2, . . . , N).

Figure 6:
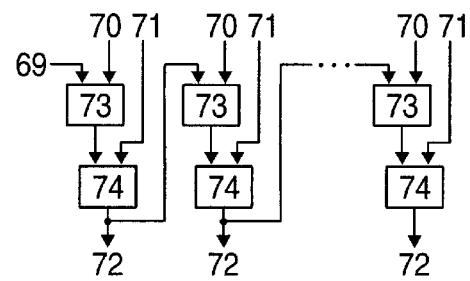
FIG. 6 shows a block diagram of a carry look-ahead circuit that can be applied in the saturation unit.

FIG. 6 discloses a simplest carry look-ahead circuit, comprises AND gates 73 and OR gates 74 of quantity of N both. Each input of the carry propagation through the respective bit 70 of said circuit is connected to first input of the respective AND gate 73, which output is connected to first input of the respective OR gate 74, which second input and output are respectively connected to carry generation input of the respective bit 71 and to output of the carry to the same bit 72 of said circuit. Second input of the first AND gate 73 is initial carry input 69 of said circuit, and second input of q-th AND gate 73 is connected to output of (q−1)-th OR gate 74 (where q=2,3, . . . , N).

Figure 7:
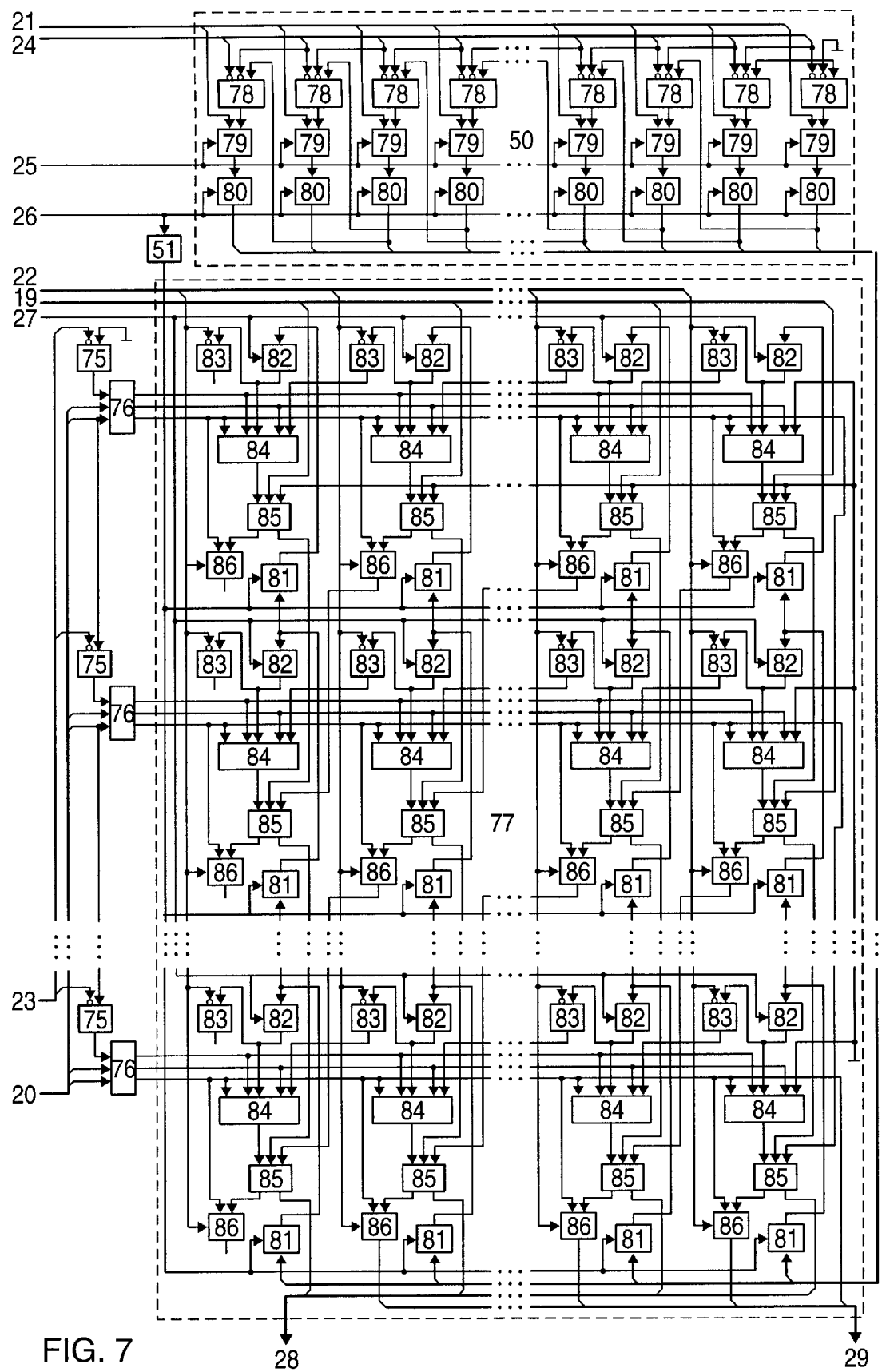
FIG. 7 shows a block diagram of the calculation unit.

The calculation unit, which block diagram is presented in FIG. 7, comprises inputs of first 19, second 20 and third 21 operand vector bits, inputs of boundary setting for first operand vectors and result vectors 22, for second operand vectors 23 and for third operand vectors 24, first 25 and second 26 inputs of load control of third operand vectors into the first memory block, input of reload control of third operand matrix from the first memory block to the second memory block 27 and outputs of bits of first summand vector of results 28 and of second summand vector of results 29. Said unit includes a shift register 50, a delay element 51, N/2 AND gates with inverted input 75, N/2 decoders of multiplier bits 76, a multiplier array 77 of N columns by N/2 cells in each column. Any bit of the shift register 50 consists of an AND gate with inverted inputs 78, a multiplexer 79 and a trigger 80. Each cell of the multiplier array 77 consists of first 81 and second 82 triggers, functioned us memory cells of respectively first and second memory blocks of said unit, an AND gate with inverted input 83, an one-bit partial product generation circuit 84, an one-bit adder 85 and a multiplexer 86. In FIG. 7 the columns of cells of the multiplier array 77 are numbered from right to left, and the cells of columns of the multiplier array 77—from top downward.

Figure 8:
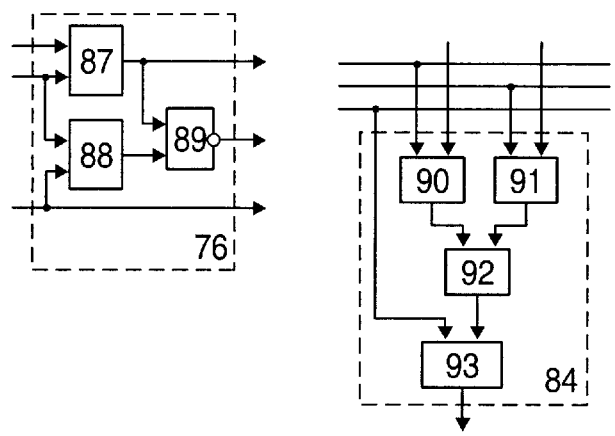
FIG. 8 shows an exemplary embodiment of a decoder of multiplier bits and an one-bit partial product generation circuit on a basis of a Booth's algorithm applied in the calculation unit.

FIG. 8 illustrates an exemplary implementation of the decoder of multiplier bits 76 and the one-bit partial product generation circuit 84 on the basis of Booth's algorithm. The decoder of multiplier bits 76 comprises an EXCLUSIVE OR gate 87, an EQUIVALENCE gate 88 and a NOR gate 89. The one-bit partial product generation circuit 84 comprises AND gates 90 and 91, an OR gate 92 and an EXCLUSIVE OR gate 93.

Figure 9:
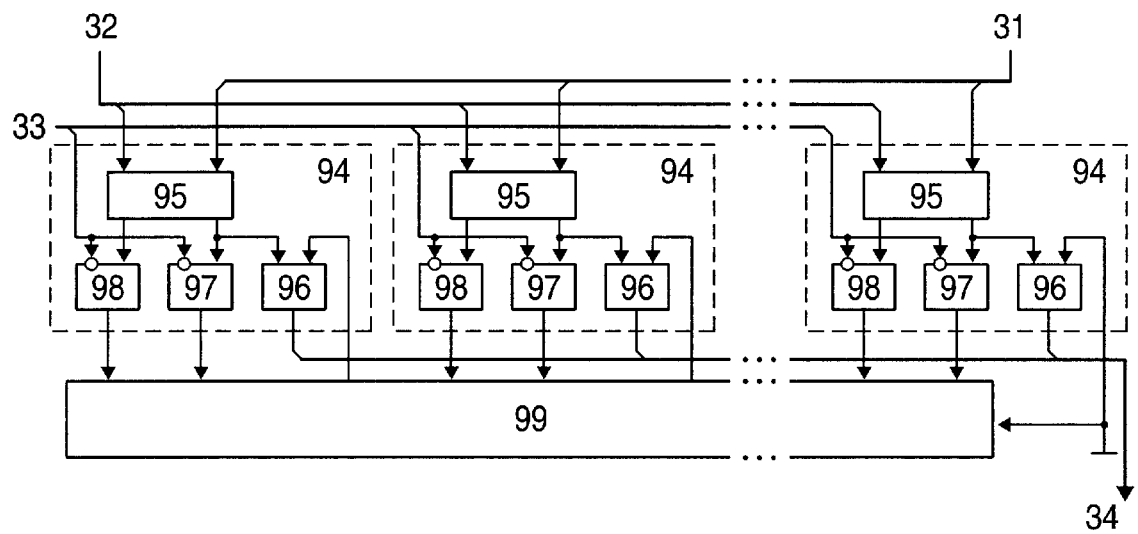
FIG. 9 shows a block diagram of an adder circuit of vectors of programmable word length data.

The adder circuit, which block diagram is presented in FIG. 9, has inputs of bits of first summand vector 31 and of second summand vector 32, inputs of data boundaries setting for summand vectors and sum vectors 33 and outputs of bits of sum vector 34. Each of N bits 94 of the adder circuit comprises a half-adder 95, an EXCLUSIVE OR gate 96, first 97 and second 98 AND gates with inverted input. Also the adder circuit includes a carry look-ahead circuit 99.

EXEMPLARY EMBODIMENTS OF THE PRESENT INVENTION

The neural processor, which block diagram is presented in FIG. 1, comprises first 1, second 2, third 3, fourth 4, fifth 5 and sixth 6 registers, a shift register 7, a AND gate 8, first and second 10 FIFOs, a switch from 3 to 2 11, a multiplexer 12, first 13 and second 14 saturation units, each of them has inputs of bits of input operand vector 15, control inputs 16 and outputs of bits of result vector 17, a calculation unit 18, comprising inputs of bits of first 19, of second and of third 21 operand vector, inputs of data boundaries setting for first operand vectors and result vectors 22, for second operand vectors 23 and for third operand vectors 24, first 25 and second 26 inputs of load control of third operand vectors into the first memory block, input of reload control of third operand matrix from the first memory block to the second memory block 27 and outputs of bits of first 28 and second 29 summand vectors of results of the addition of first operand vector and product of the multiplication of second operand vector by third operand matrix, stored into the second memory block, and an adder circuit 30, comprising inputs of bits of first 31 and second 32 summand vectors, inputs of data boundaries setting for summand vectors and sum vectors 33 and outputs of bits of sum vector 34. The neural processor has first 35 and second 36 input buses and output bus 37. Control inputs 38 of the switch from 3 to 2 11, control input 39 of the multiplexer 12, control input 40 of the first register 1, control input 41 of the second register 2, control input 42 of the third register 3, control input 43 of the fourth register, write control input 44 of the shift register 7, write control input 45 of the first FIFO 9, write 46 and read 47 control inputs of the second FIFO 10 and described above control inputs 26 and 27 of the calculation unit 18 are respective control inputs of the neural processor. State outputs 48 of the first FIFO 9 and state outputs 49 of second FIFO 10 are state outputs of the neural processor.

First data inputs of bits of the switch from 3 to 2 11, data inputs of the first FIFO 9, of first 1, second 2, third 3 and fourth 4 registers and parallel data inputs of the shift register 7 are bit-by-bit coupled and connected to first input bus 35 of the neural processor, which bits of second input bus 36 are connected to second data inputs of the respective bits of the switch from 3 to 2 11. First outputs of bits of the switch from 3 to 2 11 are connected to inputs of the respective bits of input operand vector 15 of the first saturation unit 13, control inputs 16 of bits of which are connected to output of the corresponding bits of the second register 2. Second outputs of bits of the switch from 3 to 2 11 are connected to inputs of the respective bits of input operand vector 15 of the second saturation unit 14, control inputs 16 of bits of which are connected to outputs of respective bits of the third register 3. Outputs of bits of the first register 1 are connected to first data inputs of respective bits of the multiplexer 12, second data inputs of bits of which are connected to outputs of respective bits of result vector 17 of the first saturation unit 13. Outputs of bits of the multiplexer 12 are connected to inputs of the respective bits of first operand vector 19 of the calculation unit 18, inputs of bits of second operand vector of which are connected to outputs of the respective bits of result vector 17 of the second saturation unit 14. Data outputs of the first FIFO 9 are connected to inputs of the respective bits of third operand vector 21 of the calculation unit 18, outputs of bits of first summand vector of results 28 of which are connected to inputs of respective bits of first summand vector 31 of the adder circuit 30, inputs of bits of second summand vector 32 of which are connected to outputs of respective bits of second summand vector of results 29 of the calculation unit 18, inputs of data boundaries setting for first operand vectors and result vectors 22 of which are connected to outputs of the respective bits of the fifth register 5 and to the respective inputs of data boundaries setting for summand vectors and sum vectors 33 of the adder circuit 30, outputs of bits of sum vector 34 of which are connected to respective data inputs of the second FIFO 10, which data outputs are connected to the respective bits of output bus 37 of the neural processor and to third inputs of the respective bits of the switch from 3 to 2 11. Outputs of bits of the fourth register 4 are connected to data inputs of the respective bits of the fifth register 5 and to the respective inputs of data boundaries setting for third operand vectors 24 of the calculation unit 18, inputs of data boundaries setting for second operand vectors 23 of which are connected to output of the respective bits of the sixth register 6, which data inputs are connected to outputs of the respective bits of the shift register 7, which sequential data input and output are coupled and connected to first input of load control of third operand vectors into the first memory block 25 of the calculation unit 18 and to first input of the AND gate 8, which output is connected to read control input of the first FIFO 9. Shift control input of the shift register 7 is connected to second input of the AND gate 8 and to second input of load control of third operand vectors into the first memory block 26 of the calculation unit 18, which input of reload control of third operand matrix from the first memory block to the second memory block 27 is connected to control inputs of fifth 5 and sixth 6 registers.

The neural processor executive units are the first 13 and the second 14 saturation units, the calculation unit 18 and the adder circuit 30. Each of these units executes operations over vectors of programmable word length data in two's complement presentation.

In each clock cycle of the neural processor operation the calculation unit 18 generates a partial product of the multiplication of the vector $Y=(Y_1\ Y_2\ \ldots\ Y_K)$, which bits are supplied to inputs 20 of the calculation unit 18, by the matrix $$Z = \begin{pmatrix} z_{1,1} & z_{1,2} & \cdots & z_{1,M} \\ z_{2,1} & z_{2,2} & \cdots & z_{2,M} \\ \vdots & \vdots & & \vdots \\ z_{K,1} & z_{K,2} & \cdots & z_{K,M} \end{pmatrix},$$

previously loaded and stored in the second memory block of the calculation unit 18, with addition to the obtained product of the vector $X=(X_1\ X_2\ \ldots\ X_M)$, which bits are supplied to inputs 19 of the calculation unit 18. And on outputs 28 and 29, of the calculation unit 18 bits of $A=(A_1\ A_2\ \ldots\ A_M)$ and $B=(B_1\ B_2\ \ldots\ B_M)$ vectors are generated, which sum is the result of the operation $X+Y\times Z$. I.e. the sum of the m-th elements of vectors A and B is defined by the following expression:

$$A_m + B_m = X_m + \sum_{k=1}^{K} Y_k \times Z_{k,m} (m = 1, 2, \ldots, M).$$

Vector X is an N-bit word of M packed data in two's complement presentation, which are elements of this vector. And the last significant bits of vector X are bits of the first datum $X_1$, then bits of the second datum $X_2$ are followed, etc. The most significant bits of vector X are bits of the M-th datum $X_M$. With such packing the v-th bit of the m-th datum $X_m$ is the $$\left(v + \sum_{\mu=1}^{m-1} N_\mu\right) - th$$

bit of vector X, where $N_m$—the word length of the m-th datum $X_m$ of vector X, $v=1,2,\ldots,N_m$, $m=1,2,\ldots,M$. The number of data M in vector X and the number of bits $N_m$ in the m-th datum $X_m$ of this vector may be any integer value from 1 to N, where $m=1,2,\ldots,M$. The only restriction is that the total word length of all the data, packed in one vector X, should be equal to its word length:

$$\sum_{m=1}^{M} N_m = N.$$

Vector Y is an N-bit word of K packed data in two's complement presentation, which are elements of this vector. Format of vector Y is the same as that of vector X. However, these vectors may differ in the number of elements and word length of separate data, packed in these vectors. The minimal word length J of each datum, packed in vector Y, is defined by the hardware implementation of the multiplication in the calculation unit 18. When the algorithm of partial products is implemented, J is equal to 1, when the modified Booth's algorithm is implemented, J is equal to 2. The number of bits $N'_k$ in the k-th datum $Y_k$ of vector Y may be any integer value from J to N that is multiple of J, where $k=1,2,\ldots,K$. The number of data K in vector Y may be any integer value from 1 to N/J. However, the total word length of all the data, packed in one vector Y, should be equal to its word length:

$$\sum_{k=1}^{K} N'_k = N.$$

The k-th row of matrix Z is a data vector $Z_k=(Z_{k,1}\ Z_{k,2}\ \ldots\ Z_{k,M})$, where $k=1,2,\ldots,K$. And each of the vectors $Z_1, Z_2, \ldots, Z_K$ should have the same format as that of vector X.

Vectors A and B, generated at the outputs 28 and 29 of the calculation unit 18, have the same format as that of vector X.

Tuning of the calculation unit 18 hardware to process vectors of the required formats is made by means of loading the N-bit control word H to the fifth register 5, which outputs are connected to inputs 22 of the calculation unit 18, and the (N/J)-bit control word E to the sixth register 6, which outputs are connected to inputs 23 of the calculation unit 18.

The value 1 of the n-th bit $h_n$ of the word H means that the calculation unit 18 will regard the n-th bit of each of the vectors $X, Z_1, Z_2, \ldots, Z_K$ as the most significant (sigh) bit of the corresponding element of this vector. The number of bits with the value 1 in the word H is equal to the number of elements in each of the vectors $X, Z_1, Z_2, \ldots Z_K$:

$$\sum_{n=1}^{N} h_n = M.$$

The value 1 of the i-th bit $e_i$ of the word E means that the calculation unit 18 will regard the i-th J-bit group of bits of vector Y as a group of last significant bits of the corresponding element of this vector. The number of bits with the value 1 in the word E is equal to the number of elements in vector Y:

$$\sum_{i=1}^{N/J} e_i = K.$$

Before the calculation unit 18 may operate as described above, the procedure of loading the matrix Z to the second memory block of the calculation unit 18 and the control words H and E to the fifth 5 and the sixth 6 registers respectively should be executed. This procedure is executed for several stages.

Initially vectors $Z_1, Z_2, \ldots, Z_K$ are sequentially written to the first FIFO 9 from first input bus 35 of the neural processor. The whole matrix Z is loaded to the first FIFO 9 per K clock cycles, in each of them the active signal of the first FIFO 9 write control is applied to input 45 of the neural processor.

Then the control word H is loaded to the fourth register 4 from first input bus 35 of the neural processor, and in order to do that an active signal, enabling to write to the fourth register 4, is applied to input 43 of the neural processor during one clock cycle. At the next clock cycle the control word E is loaded to the shift register 7 from first input bus 35 of the neural processor, and in order to do that an active signal, enabling to write to the shift register 7, is applied to input 44 of the neural processor during one clock cycle.

During the next N/J clock cycles the matrix Z is moved from the first FIFO 9 to the first memory block of the calculation unit 18. In each of these N/J clock cycles an active control signal is applied to the neural processor control input, connected to the shift control input of the shift register 7, to one of the inputs of AND gate 8 and to the input 26 of the calculation unit 18. In each clock cycle this signal initiates a shift of the shift register 7 contents of one bit right and, hence, the transmitting the next bit of the control word E to its serial output. The signal from the serial output of the shift register is applied to the control input 25 of the calculation unit 18 and to one of the inputs of the AND gate 8. With the value 1 of this signal an active signal is generated at the output of the AND gate 8, which supplies the read control input of the first FIFO 9. As a result of that one of the vectors $Z_1, Z_2, \ldots, Z_K$ is applied to the inputs 21 of the calculation unit 18 from the first FIFO 9 and this vector is written to the first memory block of the calculation unit 18. The number of clock cycles, necessary to load one vector $Z_k$, depends on the word length $N'_K$ of the operand $Y_k$, included in vector Y, and is equal to $N'_k/J$ (k=1,2, ... ,K). During matrix Z loading to the first memory block of the calculation unit 18 the control word H, stored all this time in the fourth register 4, is applied to inputs 24 of the calculation unit 18 with the purpose of tuning its hardware for receiving vectors $Z_1, Z_2, \ldots, Z_K$ of the required format. Since the signal from the serial output of the shift register 7 is applied also to its serial data input and since the word length of the shift register 7 is equal to N/J, when the process of matrix Z loading to the first memory block of the calculation unit 18 is complete, the shift register 7 will contain the same data as before this process, i.e. the control word E.

After that an active signal is applied to the neural processor control input, connected to the control input 27 of the calculation unit 18 and to control inputs of the fifth 5 and the sixth 6 registers. As a result of that the matrix Z is loaded from the first block to the second memory block of the calculation unit 18, the control word H is rewritten from the fourth register 4 to the fifth register 5, and the control word E is rewritten from the shift register 7 to the sixth register 6 per one clock cycle.

Starting from the next clock cycle the calculation unit 18 will perform the described above operation in every clock cycle $$A+B=X+Y\times Z.$$

The adder circuit 30 executes the addition of vectors A and B, applied to its inputs 31 and 32 from outputs 28 and 29 of the calculation unit 18 in each clock cycle. And at the outputs 34 of the adder circuit 30 vector $S=(S_1\ S_2\ \ldots\ S_M)$ is generated, which m-th element is equal to the sum of the m-th elements of vectors A and B:

$$S_m=A_m+B_m (m=1,2,\ldots,M).$$

And vector S will have the same format as vectors A and B. Tuning of the adder circuit 30 hardware to process vectors of the required formats is provided by means of supplying the control word H, stored in the fifth register 5, to the inputs 33 of the adder circuit 30.

Thus, the sequential connection of the calculation unit 18 and the adder circuit 30 allows to execute the operation $S=X+Y\times Z$ over vectors of the programmable word length data in each clock cycle. The results of this operation over different sets of input operands vectors are written to the second FIFO 10, functioned us intermediate result accumulator, and in order to do that the signal, enabling to write to the second FIFO 10, is applied to input 46 of the neural processor.

The calculation unit 18 and the adder circuit 30 can be used as a one-cycle switch of K data, packed in one N-bit vector Y, applied to inputs 20 of the calculation unit 18, to M data, packed in one N-bit vector S, generated at the outputs 34 of the adder circuit 30. Such switching is performed by means of the operation $S=X+Y\times Z$ execution, where vector X is applied to inputs 19 of the calculation unit 18, all bits of this vector are zero values, and in the second memory block of the calculation unit 18 matrix Z is stored, which defines the switching rules. And matrix Z should satisfy the following requirements: the element $Z_{k,m}$, located at the intersection of the k-th row and of the m-th column of matrix Z, should have the value 1—(00 . . . 01)b, if it is required that the m-th element $S_m$ of vector S is equal to the k-th element $Y_k$ of vector Y, or the value 0—(00 . . . 00)b otherwise; vector $Z_k$, which is the k-th row of matrix Z, should be of the same format as vector S; and each column of matrix Z should contain not more than one element having the value 1 (k=1,2, . . . ,K; m=1,2, . . . ,M). The described above procedure of loading the control word H, defining the required format of vector S, to the fifth register 5, the control word E, defining the required format of vector Y, to the sixth register 6 and matrix Z, defining the commutation rules, to the second memory block of the calculation unit 18 should forego before the switching operation.

The operation $S=X+Y\times Z$ is executed per one clock cycle, while the process of matrix Z loading to the first memory block of the calculation unit 18 occupies not less than N/J clock cycles. So the effective usage of the neural processor computing resources is achieved only when data vector packages are processed, and to support that the second memory block is incorporated to the calculation unit 18 and not a register but a two-port FIFO is used as the intermediate result accumulator 10.

At package processing the set of input operands vectors, applied sequentially to each of the inputs 19 and 20 of the calculation unit 18, is split into successively processed subsets (packages). The set of input operands vectors, applied sequentially to each of the inputs 19 and 20 of the calculation unit 18 and included to the r-th package, can be presented in the form of a vector of data vectors:

$$X^\tau = \begin{pmatrix} X^{\tau,1} \\ X^{\tau,2} \\ \vdots \\ X^{\tau,T_\tau} \end{pmatrix},$$

$$Y^\tau = \begin{pmatrix} Y^{\tau,1} \\ Y^{\tau,2} \\ \vdots \\ Y^{\tau,T_\tau} \end{pmatrix},$$

where $T_\tau$—the number of vectors, included into every τ-th package. And all vectors in one package should have the same format, i.e. the contents of the fifth 5 and the sixth 6 registers should remain unchanged during one package processing.

Processing of the τ-th packages $X^\tau$ and $Y^\tau$ is executed per $T_\tau$ clock cycles. And at the t-th clock cycle the calculation unit 18 and the adder circuit 30 execute the operation $$S^{\tau,t} = X^{\tau,t} + Y^{\tau,t} \times Z^\tau \quad (t=1,2,\ldots,T_\tau),$$

where $Z^\tau$—the contents of the second memory block of the calculation unit 18, which should remain unchanged during the τ-th packages $X^\tau$ and $Y^\tau$ processing. The whole process of the τ-th packages $X^τ$ and $Y^τ$ processing can be considered as the procedure of multiplication of the data matrix $Y^τ$ by the data matrix $Z^τ$ with accumulation of the results.

Simultaneously with the τ-th vector package processing the described above procedure of successive loading of the control word $H^{τ+1}$, defining the format of vectors of the (τ+1)-th package $X^{τ+1}$, to the fourth register 4, of the control word $E^{τ+1}$, defining the format of vectors of the (τ+1)-th package $Y^{τ+1}$, to the shift register 7 and moving of the matrix $Z^{τ+1}$ from the first FIFO 9 to the first memory block of the calculation unit 18 is executed. And it is necessary to load new values to the fourth register 4 only if vectors of the (τ+1)-th package $X^{τ+1}$ differ in format from vectors of the τ-th package $X^τ$, and it is necessary to load new values to the shift register 7 only if vectors of the (τ+1)-th package $Y^{τ+1}$ differ in format from vectors of the τ-th package $Y^τ$. This procedure occupies not more than N/J+2 clock cycles.

When both of the mentioned processes are complete, an active signal, initiating simultaneous move of the word $H^{τ+1}$ from the fourth register 4 to the fifth register 5, of the word $E^{τ+1}$ from the shift register 7 to the sixth register 6 and of matrix $Z^{τ+1}$ from the first to the second memory block of the calculation unit 18, is applied to the neural processor control input 27. All these moves are executed per one clock cycle.

The number of vectors $T_τ$ in every τ-th package may be determine in program mode but it should not exceed the value $T_{max}$ that is equal to the number of cells in the second FIFO 10. On the other hand, it is not expedient to use packages of vectors with $T_τ$ less than N/J+2, because in this case the neural processor computing facilities are not used efficiently.

Simultaneously with the matrix $Z_{τ+1}$ move from the first FIFO 9 to the first memory block of the calculation unit 18 the successive loading of the third operands vectors that compose the matrixes $Z^{τ+2}$, $Z^{τ+3}$, etc. from the neural processor first input bus 35 to the first FIFO 9 may be executed.

All the simultaneous processes are synchronized by means of analyzing the signals of state of the first 9 and the second 10 FIFOs, applied to the outputs 48 and 49 of the neural processor, and by means of control signals applied to the corresponding inputs of the neural processor.

The switch from 3 to 2 11 and the multiplexer 12 form the commutation system, due to which the contents of the second FIFO 10 or data, supplied from one of the neural processor input buses 35 or 36, can be applied as to inputs of the first operand vector 19, as to inputs of the second operand vector 20 of the calculation unit 18. Besides, the contents of the register 1, previously written to it from the neural processor first input bus 35 by the active signal supply to the neural processor control input 40, can be applied to inputs 19 of the calculation unit 18. Selection of sources of data, applied to inputs 19 and 20 of the calculation unit 18, is made by means of setting a certain combination of signals on the neural processor control inputs 38 and 39. And if the data source is the second FIFO 10, then the signal, enabling to read from the second FIFO 10, should be applied to the neural processor control input 47.

Data vectors, applied to inputs 19 and 20 of the calculation unit 18 from the second FIFO 10 or from one of the neural processor input buses 35 or 36, pass through saturation units 13 and 14. Each of the units 13 and 14 calculates per one clock cycle the saturation function from each element of vector $D=(D_1 D_2 \ldots D_L)$, applied to inputs 15 of this device.

Vector D is an N-bit word of L packed data in two's complement presentation, which are elements of this vector. Vector D format is the same of that of described above vector X. However, these vectors can differ in the number of elements and the word length of separate data, packed in them. The minimal word length of data, composing vector D, is equal to two. The number of data L in vector D may be any integer value from 1 to N/2. However, the total word length of all the data, packed in one vector D, should be equal to its word length:

$$\sum_{\lambda=1}^{L} N''_\lambda = N.$$

At outputs 17 of the saturation units 13 or 14 a vector is $F=(F_1 F_2 \ldots F_L)$ is generated, which has the same format as that of vector D. And the λ-th element $F_\lambda$ of vector F is the result of calculation of the saturation function over the λ-th operand $D_\lambda$ of vector D:

$$F_\lambda = \Psi_{Q\lambda}(D_\lambda),$$

where $Q_\lambda$ is a parameter of the saturation function, calculated for the operand $D_\lambda$ (λ=1,2...,L). The general view of the saturation function calculated by the units 13 and 14, is presented in FIG. 2 and may be described by the following expressions:

$$\Psi_Q(D) = D, \text{ if } -2^Q \leq D \leq 2^Q - 1;$$
$$\Psi_Q(D) = 2^Q - 1, \text{ if } D > 2^Q - 1;$$
$$\Psi_Q(D) = -2^Q, \text{ if } D < -2^Q.$$

The number of significant bits in the element $F_\lambda$ of vector F without taking the sign bit into account is equal to the value of the parameter $Q_\lambda$(λ=1,2, ... ,L). It is obvious that the value $Q_\lambda$ should be less than the word length $N''_\lambda$ of operands $D_\lambda$ and $F_\lambda$.

Tuning of the hardware of each of the saturation units 13 or 14 for the required format of vectors D and F and also for the required values of parameters of the implemented saturation functions is made by means of setting an N-bit control word U to control inputs 16 of said unit. And the bits of word U should have the following values: bits from the first to the ($Q_1$)-th—are the value 0 each, bits from the ($Q_1$+1)-th to the ($N''_1$)-th—are the value 1 each, bits from the ($N''_1$+1)-th to the ($N''_1+Q_2$)-и-are the value 0 each, bits from the ($N''_1+Q_2$+1)-th to the ($N''_1+N''_2$)-th—are the value 1 each, etc. In the general case the bits of U word from the $$\left(1 + \sum_{\mu=1}^{\lambda-1} N''_\mu\right)\text{-}th$$

to the $$\left(Q_\lambda + \sum_{\mu=1}^{\lambda-1} N''_\mu\right)\text{-}th$$

bit should be the value 0 each and from the $$\left(1 + Q_\lambda + \sum_{\mu=1}^{\lambda-1} N''_\mu\right)\text{-th}$$

to the $$\left(\sum_{\mu=1}^{\lambda} N''_\mu\right)\text{-th}$$

bit—the value 1 each ($\lambda=1,2,\ldots,L$).

If the value of the n-th bit of the word U is equal to 1 ($u_n=1$) and the value of the (n+1)-th bit is equal to 0 ($u_{n+1}=0$), then the saturation unit 13 or 14 will regard the n-th bit of vector D as the most significant (sign) bit of the corresponding element of this vector. The number of zero bits in the word U is equal to the total number of significant bits in all the elements of the vector of results F:

$$\sum_{n=1}^{N} \overline{u_n} = \sum_{\lambda=1}^{L} Q_\lambda.$$

If U=(100 . . . 0)b, then data from inputs 15 of the saturation unit 13 or 14 will pass to its outputs 17 without changes (F=D).

The control word of the first saturation unit 13 is loaded from the neural processor first input bus 35 to the second register 2, which outputs are connected to control inputs 16 of the saturation unit 13. This load is executed per one clock cycle by means of an active signal, applied to the control input 41 of the second register 2.

The control word of the second saturation unit 14 is loaded from the neural processor first input bus 35 to the third register 3, which outputs are connected to control inputs 16 of the saturation unit 14. This load is executed per one clock cycle by means of an active signal applied to the control input 42 of the third register 3.

The saturation units 13 and 14 are an effective medium to prevent arithmetic overflow when the input operand vectors are processed.

Each of the saturation units 13 or 14 allows to reduce only the number of significant bits in elements of the processed data vector. The word length of separate elements of the data vector and its format remain unchanged. At the same time in some cases it is expedient to calculate saturation functions for elements of data vector with reducing the word length of every element of the result vector by means of discarding all its most significant bits which are the extension of the sign bit of this element. Such a word length reduction of elements of the vector $F=(F_1\ F_2\ \ldots\ F_L)$, generated at the outputs 17 of the saturation unit 14, and the repackaging of elements in vectors due to this reduction can be executed per one clock cycle by means of the calculation unit 18 and the adder circuit 30, which operate as data switch from 2L directions to L+1. As an example there is below a description of the vector F transformation to vector $S=(S_1\ S_2\ \ldots\ S_{L+1})$ generated at the outputs 34 of the adder circuit 30, where the $\lambda$-th element $S_\lambda$ is $Q_\lambda+1$ of low-order (significant) bits of the $\lambda$-th element $F_\lambda$ of vector F ($\lambda=1,2,\ldots,L$), and the (L+1)-th element $S_{L+1}$, located in most significant bits of vector S, is equal to (00 . . . 0)b. Vector F, generated at outputs 17 of the unit 14, may be presented in the form of vector $Y=(Y_1\ Y_2\ \ldots\ Y_{2L})$, applied to inputs 20 of the calculation unit 18, where the first $Y_{2\lambda-1}$, and the second $Y_{2\lambda}$ elements of the $\lambda$-th pair of elements are respectively $Q_\lambda+1$ of last significant and $N''_\lambda-Q_\lambda-1$ of most significant bits of the $\lambda$-th $N''_\lambda$-bit element $F_\lambda$ of vector F ($\lambda=1,2,\ldots,L$). In the data switching mode zero values are applied to inputs 19 of the calculation unit 18, and due to this fact the result of multiplication of vector Y by matrix Z, stored in the second memory block of the calculation unit 18, is generated at outputs 34 of the adder circuit 30. This result will be the vector S of the required format, if the control word H, defining the described above vector S format, is stored in the fifth register 5, the control word E, defining the described above vector Y format,—in the sixth register 6 and matrix Z, containing L+1 elements in each of its 2L rows,—in the second memory block of the calculation unit 18. And matrix Z should satisfy the following requirements: the word length of each element of the $\lambda$-th column of matrix Z should be equal to $Q_\lambda+1$; the element $Z_{2\lambda-1,\lambda}$, located at the intersection of the (2$\lambda$−1)-th row and the $\lambda$th column of matrix Z, should have the value 1—(00 . . . 0)b, and the rest elements of matrix Z should have the value 0—(00 . . . 00)b ($\lambda=1,2,\ldots,L$).

If at execution of the described above operation of transforming vector F, generated at outputs 17 of the saturation unit 14, vector $X=(X_1\ X_2\ \ldots\ X_{M+1})$ is applied to inputs 19 of the calculation unit 18, which the first element $X_1$ is equal to zero and has the word length equal to $$L + \sum_{\lambda=1}^{L} Q_\lambda,$$

then vector $S=(S_1\ S_2\ \ldots\ S_{L+M})$ will be generated at the outputs 34 of the adder circuit 30, where the $\lambda$-th element $S_\lambda$ is $Q_\lambda+1$ of low-order (significant) bits of the $\lambda$-th element $F_\lambda$ of vector F ($\lambda=1,2,\ldots,L$), and the (L+m)-th element is equal to the (m+1)-th element $X_{m+1}$ of vector X (m=1,2, . . . ,M). Thus, the neural processor allows to execute the saturation over elements of input data vector and to pack the obtained result to another input data vector per one clock cycle.

The main function of the neural processor is emulation of various neural networks. In the general case one neural network layer consists of $\Omega$ neurons and has $\Theta$ neural inputs. And the $\omega$-th neuron executes weighted summation of $\Theta$ data $C_1, C_2, \ldots, C_\Theta$, applied to the respective neural inputs with taking into account the neuron bias $V_\omega$:

$$G_\omega = V_\omega + \sum_{\vartheta=1}^{\Theta} C_\vartheta \times W_{\vartheta,\omega},$$

where $W_{\theta,\omega}$—a weight coefficient of the $\theta$-th input in the $\omega$-th neuron ($\theta=1,2,\ldots,\Theta;\omega=1,2,\ldots,\Omega$).

Then the $\omega$-th neuron calculates the saturation function $\Psi_{Q_{107}}$ over the result of weighted summation $G_\omega$:

$$R_\omega = \Psi_{Q\omega}(G_\omega).$$

The general view of the saturation function, implemented by the neural processor, is presented in FIG. 2. All input data, weight coefficients, bias values and results are presented as two's complements.

The peculiarity of the offered neural processor is that the user can set the following neural network parameters in program mode: the number of layers, the number of neurons and neural inputs in each layer, the word length of data at each neural input, the word length of each weight coefficient, the word length of output value of each neuron and the saturation function parameter for each neuron.

One neural processor can emulate a neural network of a practically unlimited size. A neural network is emulated per layer (sequentially layer-by-layer).

Each neural network layer is divided to sequentially processed fragments. This division is made in the following way. The set of neural inputs of a layer is divided into groups so that the total word length of data applied to all inputs of each group of inputs is equal to the neural processor word length N. The set of neurons of a layer is divided into groups of neurons so that the total word length of the results of weighted summation of all input data for each neuron group is equal to the neural processor word length N. And the whole neural network layer is divided into fragments of two types having different function. Each fragment of the first type executes weighted summation of data applied to all neural inputs, included into one group of inputs, for all neurons from one neuron group. Each fragment of the second type generates output values for all neurons from one neuron group by means of calculation of the saturation function over the results of weighted summation of all input data.

FIG. 3 can be used as illustration of the described above principle of the neural network layer division into fragments. For this it is necessary to consider that each block, presented in FIG. 3, executes operations over N-bit data vectors and to treat the designations in this figure in the following way:

$C_\theta$—a vector of data, applied to the θ-th group of neural inputs ($\theta=1,2,\ldots,\Theta$);

$V_\omega$—a vector of bias values of the ω-th neuron group ($\omega=1,2,\ldots,\Theta$);

$W_{\theta,\omega}$—a matrix of weight coefficients of input data, applied to the θ-th group of neural inputs, in the ω-th neuron group ($\theta=1,2,\ldots,\Theta$); $\omega=1,2,\ldots\Omega$);

$G_\omega$—a result vector of input data weighted summation in the ω-th neuron group ($\omega=1,2,\ldots,\Omega$);

$R_\omega$—a vector of output values of the ω-th neuron group ($\omega=1,2,\ldots,Q$).

In FIG. 3 a pair of devices, executing multiplication and addition, corresponds to each fragment of the first type, and one saturation unit corresponds to each fragment of the second type.

The whole neural network emulation process on one neural processor can be presented in the form of Ω successively executed procedures, each of them emulates one neuron group and consists of Θ+1 successively executed macro-operations, each of them emulates one fragment of a neural network layer. And the θ-th macro-operation of this procedure emulates a fragment of the first type, which executes weighted summation of data, applied to the θ-th group of neural inputs, with accumulation of the result ($\theta=1,2,\ldots,\Theta$). The last macro-operation of the procedure emulates a fragment of the second type, which executes saturation function over the weighted sum of data, applied to all neural inputs, for the corresponding neuron group.

Each macro-operation, executed during the neural network layer emulation, has preparative and executive phases. Data, applied to the neural inputs, are processed in the package mode—by T input data sets in each package.

The following operations are successively performed during the preparative phase of the first macro-operation of the ω-th group of neuron emulation procedure. Vector $V_\omega$ is loaded from the neural processor first input bus 35 to the first register 1. From the neural processor first input bus 35 to the fourth register 4 a control word is loaded, which defines the format of vector $V_\omega$ and of all partial sums vectors, generated as the result of every θ-th macro-operation ($\theta=1,2,\ldots,\Theta$) execution. A control word is loaded from the neural processor first input bus 35 to the shift register 7, which defines the format of data vectors, applied to the first group of neural inputs. Matrix $W_{1,\omega}$ is moved from the first FIFO 9, where this matrix should be previously loaded from the neural processor first input bus 35, to the first memory block of the calculation unit 18.

At every t-th clock cycle of the executive phase of the first macro-operation of the ω-th neuron group emulation procedure vector $V_\omega$ applies to the inputs of the first operand vector 19 of the calculation unit 18 from the first register 1, and vector $C_1^t$, which is the t-th set of input data, supplied the first group of neural inputs of the layer, applies to the inputs of the second operand vector 20 of the calculation unit 18 from the neural processor second input bus 36 ($t=1,2,\ldots,T$). And the calculation unit 18 and the adder circuit 30 generate a partial sum vector $$G_{1,\omega}^t = V_\omega + C_1^t \times W_{1,\omega},$$

which is written to the second FIFO 10. And starting from the procedure of the second neuron group of emulation simultaneously with this operation a moving of the contents of one of the cells of the second FIFO 10 to the external memory via the neural processor output bus 37 will be performed in each clock cycle.

The following operations are successively performed during the preparative phase of the θ-th macro-operation ($\theta=2, 3,\ldots,\Theta$) of the ω-th neuron emulation procedure. A control word is loaded from the neural processor first input bus 35 to the shift register 7, which defines the format of data vectors applied to the θ-th group of neural inputs. Matrix $W_{\theta,\omega}$ is moved from the first FIFO 9, where this matrix should be previously loaded from the neural processor first input bus 35, to the first memory block of the calculation unit 18.

At every t-th clock cycle of the executive phase of the θ-th macro-operation ($\theta=2,3,\ldots,\Theta$) of the ω-th neuron group emulation procedure the partial sum vector $G_{\theta-1,\omega}^t$, generated as the result of the previous macro-operation, applies to the inputs of the first operands vector 19 of the calculation unit 18 from the second FIFO 10, and vector $C_\theta^t$, which is the t-th set of input data, supplied the θ-th group of neural inputs of the layer, applies to the inputs of the second operands vector 20 of the calculation unit 18 from the neural processor second input bus 36 ($t=1,2,\ldots,T$). And the calculation unit 18 and the adder circuit 30 form a partial sum vector $$G_{\theta,\omega}^t = G_{\theta-1,\omega}^t + C_\theta^t \times W_{\theta,\omega},$$

which is written to the second FIFO 10.

At execution of the Θ first macro-operations of every emulation procedure of a neuron group the saturation unit 13 may be used for the restriction of partial sums values in order to exclude the possibility of arithmetic overflow during the input data weighted summation. In this case the preparatory phase of macro-operations should include the load of a control word to the second register 2 from the neural processor first input bus 35.

The following operations are successively executed during the preparative phase of the (Θ=1)-th macro-operation ($\theta=2,3,\ldots,\Theta$) of the ω-th neuron group emulation procedure. A control word is loaded from the neural processor first input bus 35 to the third register 3, which defines the parameters of the saturation functions calculated for the ω-th neuron group. Then control data, which is necessary for execution of compressing and packing of the results of the saturation function calculations, is loaded to the fourth register 4, to the shift register 7 and to the first memory block of the calculation unit 18.

At every t-th clock cycle of the executive phase of the (Θ+1)-th macro-operation of the procedure of the ω-th neuron group emulation the partial sums vector $G_{\Theta,\omega}^t$ applies to the inputs 15 of the saturation unit 14 from the second FIFO 10, and as a result of this the following vector is generated at the outputs 17 of the saturation unit 14

$$R_\omega^t = \Psi_{Q\omega}(G_{\Theta,\omega}^t),$$

which then applies to the inputs 20 of the calculation unit 18. The calculation unit 18 and the adder circuit 30 compress vector $R_\omega^t$ by means of removal of all the bits, which are the extension of the sign bit, from all its elements. If in this case not a zero vector is applied to the inputs 19 of the calculation unit 18, but a data vector from one of the neural processor input buses 35 or 36, then the result of vector $R_\omega^t$ compression will be packed to that input data vector. The result, obtained at the t-th clock cycle of the executive phase of the (Θ+1)-th macro-operation of the (ω−1)-th neuron group emulation procedure and stored in the external memory, may be used as such vector. The result is recorded to the second FIFO 10.

When any macro-operation of a neural network fragment emulation is being executed, the change-over from the preparative phase to the executive one takes place by supply an active signal to the neural processor control input 27 per one clock cycle, preceding the first clock cycle of the executive phase. And the contents of the fourth register 4 is rewritten to the fifth register 5, the contents of the shift register 7 is rewritten to the sixth register 6 and the contents of the first memory block of the calculation unit 18 is moved to its second memory block.

The successive execution of macro-operations is performed by the neural processor in the pipeline mode, in which the executive phase of the current macro-operation is made simultaneously with the preparative phase of the next macro-operation. The number of clock cycles, necessary for execution of all operations of the preparatory phase of a macro-operation, is within the range from N/J to N/J+4, depending on the number of control words, loaded to the neural processor registers. The number of clock cycles, necessary for the executive phase of any macro-operation is equal to the number of processed input data sets T, assigned by the user. Thus, the minimal period of a macro-operation execution is determined by the preparative phase duration and is equal to the duration of N/J processor clock cycles. It is expedient to select the T value equal to N/J, because with smaller values than T the neural processor units will be not used efficiently, and with bigger values than T the time of the neural processor reaction to the next data set at the neural inputs increases, what is undesirable for real-time neural network emulation.

In the general case the process of emulation of a neural network layer, split into $\Omega \times (\Theta+1)$ fragments, for T input data sets is executed on one neural processor per $\Omega \times (\Theta+1) \times T$ clock cycles, but not less than per $\Omega \times (\Theta+1) \times N/J$ clock cycles.

A small neural network layer, where the total word length of data, applied to all neural inputs, and the total word length of the results of weighted summation for all neurons do not exceed the neural processor bit length N each, is emulated by execution of two macro-operations. The first macro-operation emulates the weighted summation of all input data for all neurons of the layer and the second one—calculation of saturation functions for all neurons of the layer.

The presence of two input 35 and 36 and one output 37 buses in the neural processor allow to create effective multiprocessor systems on its basis. A system consisting of $\Xi$ neural processors will emulate a neural network layer $\Xi$ times faster than one neural processor. In the extreme case every fragment of every layer may be emulated by a separate neural processor.

The main unit of the neural processor is the calculation unit 18.

FIG. 4 discloses a block diagram of one of possible implementations of the calculation unit 18 for execution of operations over vectors of programmable word length data, comprising a shift register 50, performed the arithmetic shift of J bits left on all N-bit vector operands, stored in it, where J—minimal value that is the aliquot part of data word lengths in second operand vectors of the calculation unit 18, a delay element 51, a first memory block 52, containing sequential input port and N/J cells to store N-bit data, a second memory block 53, containing N/J cells to store N-bit data, N/J multiplier blocks 54, each of that multiply N-bit vector of programmable word length data by J-bit multiplier, and a vector adding circuit 55, generated partial product of the summation of N/J+1 programmable word length data vectors.

Inputs of third operand vector 21 bits of calculation unit 18 are connected to data inputs of the shift register 50, which outputs are connected to data inputs of the first memory block 52, which outputs of each cell are connected to data inputs of the respective cell of the second memory block 53, which outputs of each cell are connected to inputs of multiplicand vector bits of the respective multiplier block 54, which inputs of the multiplier bits are connected to inputs of the respective J-bit group of second operand vector bits 20 of the calculation unit 18. Outputs of each multiplier block 54 are connected to inputs of bits of the respective summand vector of the vector adding circuit 55, which inputs of (N/J+1)-th summand vector bits are connected to inputs of first operand vector 19 bits of calculation unit 18, which inputs of data boundaries setting for third operand vectors 24 are connected to respective inputs of data boundaries setting for operand vectors of the shift register 50, which mode select input is connected to first input of load control of third operand vectors into the first memory block 25 of calculation unit 18, which second input of load control of third operand vectors into the first memory block 26 is connected to clock input of the shift register 50 and to input of the delay element 51, which output is connected to write control input of the first memory block 52. Write control input of the second memory block 53 is connected to input of reload control of third operand matrix from the first memory block to the second memory block 27 of calculation unit 18, which every input of data boundaries setting for second operand vectors 23 is connected to input of the sign correction of the respective multiplier block 54. Inputs of data boundaries setting for first operand vectors and for result vectors 22 of calculation unit 18 are connected to inputs of data boundaries setting for multiplicand vectors and for result vectors of each multiplier block 54 and to inputs of data boundaries setting for summand vectors and result vectors of the vector adding circuit 55, which outputs of bits of first and second summand vectors of results are respective outputs 28 and 29 of the calculation unit 18.

The calculation unit 18 operates as follows.

The procedure of loading matrix Z to the second memory block 53 of the calculation unit 18 executes at two stages.

At first per N/J clock cycles matrix Z is transformed into matrix $$Z' = \begin{pmatrix} Z'_{1,1} & Z'_{1,2} & \cdots & Z'_{1,M} \\ Z'_{2,1} & Z'_{2,2} & \cdots & Z'_{2,M} \\ \vdots & \vdots & & \vdots \\ Z'_{N/J,1} & Z'_{N/J,2} & \cdots & Z'_{N/J,M} \end{pmatrix}$$

that is loaded to the first memory block 52 of the calculation unit 18. And the i-th row of matrix Z' is a data vector $Z'_i=(Z'_{i,1} Z'_{i,2} \ldots Z'_{i,M})$, which will be then multiplied by the i-th J-bit group of bits of vector Y (i=1,2, . . . ,N/J). All vectors $Z'_1, Z'_2, \ldots, Z'_{N/J}$ have the same format as that of any of vectors $Z_1, Z_2, \ldots Z_K$. Matrix Z transforms into matrix Z' by replacement of the k-th row $Z_k$ (k=1,2, . . . ,K) of matrix Z with $N'_k/J$ rows $Z'_{I_{k-1}+1}, Z'_{I_{k-1}+2}, \ldots, Z'Z_{I_{k-1}+N'_k/J}$ of matrix Z', generated according to the expression:

$$Z_{I_{k-1}+j}=Z_k \times 2^{J(j-1)} (j=1,2, \ldots, N'_k/J),$$

where $I_k$—the total number of J-bit groups of bits in the k first operands of vector Y, $N'_k$—the word length of the k-th element $Y_k$ of vector Y.

$$I_k = \sum_{n=1}^{k} N'_n/J.$$

From presented above expression it follows that $Z'_1=Z_1$, $Z'_{N'_1/J+1}=Z_2$, $Z'_{(N'_1+N'_2)/J+1}=Z_3$ and so on. It means that all rows of the matrix Z will be present in the matrix Z' but, as a rule, at other positions.

Matrix Z is transformed into matrix Z' by means of the shift register 50 per N/J clock cycles. In each of these N/J clock cycles a clock signal is applied to the control input 26 of the calculation unit 18, and this clock signal supplies the clock input of the shift register 50, and the described above N-bit control word H is continuously applied to inputs 24 of the calculation unit 18, and this control word supplies inputs of data boundaries setting for operand vectors of the shift register 50. At the i-th clock cycle (i=1,2, . . . ,N/J) the i-th bit $e_i$ of the described above (N/J)-bit control word E is applied to the control input 25 of the calculation unit 18. This signal supplies the mode select input of the shift register 50.

At the $(I_{k-1}+1)$-th clock cycle (k=1,2, . . . ,K), when a bit of the word E of the value 1 is applied to the input 25 of the calculation unit 18, the shift register 50 changes its mode to load of vector $Z_k$, applied to the inputs 21 of the calculation unit 18. At each of the rest N/J-K clock cycles, when a bit of the word E of the value 0 is applied to the input 25 of the calculation unit 18, the shift register 50 will execute an arithmetic shift of J bits left on the data vector, stored in it.

Thus, when the i-th clock cycle (i=1,2, . . . ,N/J) of the process of matrix Z transform into matrix Z' is finished, vector $Z'_i$ will be stored in the shift register 50. Data from the outputs of the shift register 50 applies to data inputs of the first memory block 52, containing sequential input port.

The clock signal, applied to the input 26 of the calculation unit 18 at each clock cycle during the whole process of matrix Z transform into matrix Z', pass through the delay element 51, which may be a usual inverter gate, to the write control input of the first memory block 52 of the calculation unit 18. So matrix Z' loading to the first memory block 52 of the calculation unit 18 will take place simultaneously with matrix Z transformation into matrix Z'. At the end of the loading process vector $Z'_i$ (i=1,2, . . . ,N/J) will be stored in the i-th cell of the first memory block 52 of the calculation unit 18.

After that clock signal is applied to the control input 27 of the calculation unit 18 per one clock cycle, and due to this signal the contents of all cells of the first memory block 52 is rewritten to the corresponding cells of the second memory block 53 of the calculation unit 18. Thus, matrix Z' is moved from the first 52 to the second 53 memory block of the calculation unit 18 per one clock cycle.

Starting from the next clock cycle the executive unites of the calculation unit 18, which are multiplier blocks 54 and the vector adding circuit 55, will generate a partial product of the operation X+Y X Z in each clock cycle. And the i-th multiplier block 54 uses for generating a partial product of the multiplication of vector $Z'_i$, stored in the i-th cell of the second memory block 53 of the calculation unit 18, by the i-th group of bits $Y'_i$ of vector Y, applied to the inputs 20 of the calculation unit 18:

$$P_i=Z'_i \times Y'_i.$$

The control word E is applied to the inputs 23 of the calculation unit 18, and the j-th bit $e_j$ of this word supplies sign correction input of the (j−1)-th multiplier block 54 (j=2,3, . . . ,N/J).

Last significant bit $e_1$ of the control word E applies to sign correction input of the (N/J)-th multiplier block 54. So each multiplier block 54, where a group of most significant bits of one of the elements of vector Y is applied to the inputs of multiplier bits, will perform the multiplication in two's complement presentation. The rest of N/J-K multiplier blocks 54 will operate on sign-and-magnitude presentation.

The vector adding circuit 55 generates a partial product of the summation of partial products $P_1, P_2, \ldots P_{N/J}$ and of the vector X, applied to inputs 19 of the calculation unit 18. This circuit may be designed on the basis of carry save adders.

The control word H is applied to the inputs 22 of the calculation unit 18, and this control word supplies the inputs of data boundaries setting for multiplicand vectors of every multiplier block 54 and the inputs of data boundaries setting for summand vectors of the vector adding circuit 55. In this case in each executive unit of the calculation unit 18 the carry propagation between the bits of these units, which process different elements of input vectors, will be locked.

At the outputs of the vector adding circuit 55 vectors A and B are generated and their sum is equal to $$A+B = X + \sum_{i=1}^{N/J} P_i = X + \sum_{i=1}^{N/J} Y'_i \times Z'_i.$$

Having grouped the partial products, referring to separate elements of vector Y, the last expression can be presented in the following form $$A+B = X + \sum_{k=1}^{K} \sum_{j=1}^{N'_k/J} Y'_{I_{k-1}+j} \times Z'_{I_{k-1}+j} = X + \sum_{k=1}^{K} \sum_{j=1}^{N'_k/J} Y'_{I_{k-1}+j} \times Z_k \times 2^{J(j-1)}.$$

Taking into account the fact that every k-th element of vector Y is equal to $$Y_k = \sum_{j=1}^{N'_k/J} Y'_{l_{k-1}+j} \times 2^{J(j-1)},$$

the previous expression will be transformed as follows:

$$A + B = X + \sum_{k=1}^{K} Y_k \times Z_k.$$

Thus, partial product of the operation X+Y×Z is generated at the outputs 28 and 29 of the calculation unit.

In the general case the clock cycle time is defined by the total propagation delay of the successively connected the switch from 3 to 2 11, the saturation unit 14, the calculation unit 18 and the adder circuit 30. The neural processor performance can be essentially increased if to use saturation units 13 and 14, comprising input data registers, which data inputs are connected to inputs 15 of these units, the calculation unit 18, comprising an input data register, which data inputs are connected to inputs 19 and 20 of the calculation unit, the adder circuit 30, comprising an input data register, which data inputs are connected to inputs 31, 32 and 33 of the adder circuit. The presence of such registers in the neural processor executive units allows to process data in the pipeline mode, which provides parallel execution of the following three processes in each clock cycle: generating by the calculation unit 18 the partial product of the weighted summation of the current data set, addition of the partial product of the weighted summation of the previous data set on the adder circuit 30 and calculation of saturation functions for the next set of input operands on the units 13 and 14. As the maximal propagation delays of the saturation units 13 and 14, of the calculation unit 18 and of the adder circuit 30 have approximately equal values, the incorporating of the pipeline registers allows to increase the neural processor clock rate practically by three times.

The saturation unit, which block diagram is presented in FIG. 5, has inputs of input operand vector 15 bits, control inputs 16 and outputs of result vector 17 bits. Each of N bits 56 of said unit comprises first 57 and second 58 multiplexers, an EXCLUSIVE OR gate 59, an EQUIVALENCE gate 60, a NAND gate 61 and an AND gate with inverted input 66. Said unit includes also a carry propagation circuit 63, comprising a initial carry input 64, inverted inputs of the carry propagation through separate bits 65, carry inputs from separate bits 66 and outputs of the carry to separate bits 67, and a carry look-ahead circuit 68, comprising a initial carry input 69, inputs of the carry propagation through separate bits 70, carry generation inputs of separate bits 71 and outputs of the carry to separate bits 72.

Second data inputs of the first 57 and second 58 multiplexers and first input of the EXCLUSIVE OR gate 59 of each bit 56 of said unit are coupled and connected to input of the respective bit of input operand vector 15 of said unit, which output of each bit of result vector 17 is connected to output of the first multiplexer 57 of the respective bit 56 of said unit. Non inverted input of the AND gate with inverted input 62 and fist inputs of the NAND gate 61 and the EQUIVALENCE gate 60 of each bit 56 of said unit are coupled and connected to the respective control input 16 of said unit. First input of the EXCLUSIVE OR gate 59 and non inverted input of the AND gate with inverted input 62 of q-th bit 56 of said unit are respectively connected to second input of the EXCLUSIVE OR gate 59 and to inverted input of the AND gate with inverted input 62 of (q−1)-th bit of said unit, first data input of the second multiplexer 58 of which is connected to output of the carry to (N−q+2)-th bit 67 of the carry propagation circuit 63 (where q=2, 3, . . . , N). Output of the NAND gate 61 of n-th bit 56 of said unit is connected to input of carry propagation through (N−n+1)-th bit 70 of the carry look-ahead circuit 68, which output of the carry to (N−n+2)-th bit 72 is connected to control input of the first multiplexer 57 of n-th bit 56 of said unit, output of the AND gate with inverted input 62 of which is connected to control input of the second multiplexer 58 of the same bit 56 of said unit, to carry generation input of (N−n+1)-th bit 71 of the carry look-ahead circuit 68 and to inverted input of the carry propagation through (N−n+1)-th bit 65 of the carry propagation circuit 63, which carry input from (N−n+1)-th bit 66 is connected to output of the second multiplexer 58 of n-th bit 56 of said unit (where n=1,2, . . . , N). In each bit 56 of said unit output of the second multiplexer 58 is connected to second input of the EQUIVALENCE gate 60, which output is connected to first data input of the first multiplexer 57, and output of the EXCLUSIVE OR gate 59 is connected to second input of the NAND gate 61. Second input of the EXCLUSIVE OR gate 59, inverted input of the AND gate with inverted input 62 and first data input of the second multiplexer 58 of N-th bit 56 of said unit, initial carry input 64 of the carry propagation circuit 63 and initial carry input 69 of the carry look-ahead circuit are coupled and connected to "0".

As circuits 63 and 68 in the saturation unit various carry propagation circuits and carry look-ahead circuits, applied in parallel adders, may be used.

In the simplest variant of carry propagation circuit 63 implementation output of the carry to q-th bit 67 is connected to carry input from (q−1)-th bit 66 (where q=1,2, . . . , N).

The saturation unit operates as follows.

Bits of the input operand vector D=(D$_1$ D$_2$ . . . D$_l$ are applied to the inputs 15 of said unit. Vector D is an N-bit word of L packed data in two's complement presentation, which are elements of this vector. And last significant bits of vector D are bits of the first datum D$_1$, then bits of the second datum D$_2$ follow, etc. Most significant bits of vector D are bits of the L-th datum D$_L$. With such packing the v-th bit of the λ-th datum D$_\lambda$ is the $$\left(v + \sum_{\mu=1}^{\lambda-1} N_\mu\right) - th$$

bit of vector D, where N$_\lambda$—the word length of the λ-th datum D$_\lambda$ of vector D, v=1,2, . . . , N$_\lambda$, λ=1,2,. . . ,L.

The minimal word length of data, composing vector D, is equal to 2. In the general case the number of bits N$_\lambda$ in the λ-th datum D$_\lambda$ of vector D may be any integer value from 2 to N (λ=1,2,. . . ,L), and the number of data L, packed in this vector,—from 1 to N/2. The only restriction is that the total word length of all data, packed in one vector D, should be equal to its word length:

$$\sum_{\lambda=1}^{L} N_\lambda = N.$$

The unit is aimed to generate on the outputs 17 vector F=(F$_1$ F$_2$ . . . F$_l$), which the λ-th element F$_\lambda$ is the result of calculation of the saturation function of the λ-th operand D$_\lambda$ of vector D:

$$F_\lambda = \Psi_{a_\lambda}(D_\lambda),$$

where $Q_\lambda$—a parameter of the saturation function, calculated for the operand $D_\lambda$ ($\lambda=1,2,\ldots L$), The general view of the saturation function, calculated by said unit, is presented in FIG. 2 and may be described by the following expressions:

$$\Psi_Q(D) = D \quad \text{if} \quad -2^Q \leq D \leq 2^Q - 1;$$
$$\Psi_Q(D) = 2^Q - 1 \quad \text{if} \quad D > 2^Q - 1;$$
$$\Psi_Q(D) = -2^Q \quad \text{if} \quad D < -2^Q.$$

Vector F has the same format as that of vector D. The number of significant bits in the element $F_\lambda$ of vector F without taking the sign bit into account is equal to the value of the parameter $Q_\lambda$, which should be less than the word length $N_\lambda$ of the operands $D_\lambda$ and $F_\lambda$ ($\lambda=1,2,\ldots,L$).

Tuning of the hardware of said unit for the required format of vectors D and F and for the required values of parameters of the implemented saturation functions is made by means of setting an N-bit control word U to control inputs 16 of said unit.

And the bits of word U should have the following values: bits from the first to the $Q_1$-th are the value 0 each, bits from the $(Q_1+1)$-th to the $N_1$-th are the value 1 each, bits from the $(N_1+1)$-th to the $(N_1+Q_2)$-th are the value 0 each, bits from the $(N_1+Q_2+1)$-th to the $(N_1+N_2)$-th are the value 1 each, etc. In the general case the bits of U word from the $$\left(1 + \sum_{\mu=1}^{\lambda-1} N_\mu\right) - th$$

to the $$\left(Q_\lambda + \sum_{\mu=1}^{\lambda-1} N_\mu\right) - th$$

should be the value 0 each and bits from the $$\left(1 + Q_\lambda + \sum_{\mu=1}^{\lambda-1} N_\mu\right) - th$$

to the $$\left(\sum_{\mu=1}^{\lambda} N_\mu\right) - th$$

—the value 1 each ($\lambda=1,2,\ldots,L$).

If the value of the n-th bit of the word U is equal to 1 ($u_n=1$) and the value of the (n+1)-th bit is equal to 0 ($u_{n+1}=0$), then said unit will regard the n-th bit of vector D as the most significant (sign) bit of the corresponding element of this vector. The number of zero bits in the word U is equal to the total number of significant bits in all the elements of the vector of results F.

The AND gate with inverted input 62 of the n-th bit 56 of said unit generates the signal $g_n = \overline{u_{n+1}} \cap u_n$, which is the indicator that the n-th bit of said unit processes the sign bit of one of the input operands, composing vector D (hereafter $n=1,2,\ldots,N$). The second multiplexer 58 of the n-th bit 56 of said unit generates the signal $v_n = v_{n+1} \cap \overline{g_n} \cup d_n \cap g_n$, which has the value of the sign (most significant) bit of the input operand, which bit is the n-th bit $d_n$ of vector D.

With the purpose to accelerate the generation of signals $v_n$ for all bits 56 said unit the carry propagation circuit 63 is used, which may be any known circuit with sequential or look-ahead carry, applied in usual parallel adders. It is characteristics of the carry propagation circuit 63 in the offered unit that signals $v_n$ are used as input and output carry signals and inverted values of signals $g_n$ are used as signals of carry propagation through separate bits. In this case the carry is propagated from most significant bits of said unit to last significant ones.

The EXCLUSIVE OR gate 59 and the NAND gate 61 of the n-th bit 56 of said unit are used to generate the signal $P_n = \overline{u_n \cup d_{n+1} \oplus d_n}$, which is the indicator that the value of the n-th bit $d_n$ of vector D does not lead to the exceeding of saturation region determined by the word U for the input operand, which bit is the n-th bit $d_n$ of vector D.

The carry look-ahead circuit 68 generates for every n-th bit 56 of said unit the signal $c_n = c_{n+1} \cap p_n \cup g_n$, which is the indicator that the values of all bits of vector D from the n-th bit $d_n$ and up to the most significant bit of the input operand, which bit is the n-th bit $d_n$ of vector D, does not lead to the exceeding of the saturation region, determined by the word U for this input operand. Any known sequential or group carry generation circuit, applied in usual parallel adders, may be used as the circuit 68. It is characteristics of the carry look-ahead circuit 68 in the offered unit that signals $g_n$ are used as carry generation signals, applied to inputs 71, signals $P_n$ are used as carry propagation signals, applied to inputs 70, and signals $c_n$ are generated at the carry outputs 72. In this case the carry is propagated from most significant bits of said circuit to last significant ones.

The EQUIVALENCE gate 60 and the first multiplexer 57 of the n-th bit 56 of said unit generate the value of the n-th bit $f_n$ of the result vector F according to the expression $f_n = d_n \cap c_n \cup (\overline{v_n \oplus u_n}) \cap \overline{c_n}$. If $c_n=1$, then at the output of the first multiplexer 57 the value of the bit $d_n$ of vector D is set; if $c_n=0$ and $u_n=1$, then at the output of the first multiplexer 57 the non inverted value of the sign bit ($v_n$) of the corresponding operand of vector D is set; if $c_n=0$ and $u_n=0$, then at the output of the first multiplexer 57 the inverted value of the sign bit($\overline{v_n}$) of the corresponding operand of vector D is set. The result vector bits, obtained at the outputs of the first multiplexers 57, supplies the outputs 17 of said unit.

It is necessary to note that if the control word $U=(100\ldots0)b$ is applied to the inputs 16 of said unit, then the data from inputs 15 of said unit will pass to its outputs 17 without changes (F=D).

Thus, the offered saturation unit has a propagation delay approximately equal to the propagation delay of a usual parallel adder of two N-bit numbers. In this case said unit allows to simultaneously calculate saturation functions for several data, which word length may be programmed by the user.

The calculation unit, which block diagram is presented in FIG. 7, comprises inputs of first 19, second 20 and third 21 operand vector bits, inputs of boundary setting for first operand vectors and result vectors 22, for second operand vectors 23 and for third operand vectors 24, first 25 and second 26 inputs of load control of third operand vectors into the first memory block, input of reload control of third operand matrix from the first memory block to the second memory block 27 and outputs of bits of first summand vector of results 28 and of second summand vector of results 29. Said unit includes a shift register 50, a delay element 51, N/2 AND gates with inverted input 75, N/2 decoders of multiplier bits 76, a multiplier array 77 of N columns by N/2 cells in each column. Any bit of the shift register 50 consists of an AND gate with inverted inputs 78, a multiplexer 79 and a trigger 80. Each cell of the multiplier array 77 consists of first 81 and second 82 triggers, functioned us memory cells of respectively first and second memory blocks of said unit, an AND gate with inverted input 83, an one-bit partial product generation circuit 84, an one-bit adder 85 and a multiplexer 86. In FIG. 7 the columns of cells of the multiplier array 77 are numbered from right to left, and the cells of columns of the multiplier array 77—from top downward.

Input of each bit of first operand vector 19 of said unit is connected to second input of the one-bit adder 85 of the first cell of the respective column of the multiplier array 77, first input of the one-bit adder 85 of each cell of which is connected to output of the one-bit partial product generation circuit 84 of the same cell of the multiplier array 77, control inputs of multiplexers 86 and inverted inputs of the AND gates with inverted input 83 of all cells of each column of which are coupled and connected to respective input of data boundaries setting for first operand vectors and for result vectors 22 of said unit. Each input of data boundaries setting for second operand vectors 23 of said unit is connected to inverted input of the respective AND gate with inverted input 75, which output is connected to first input of the respective decoder of multiplier bits 76. Respective control inputs of the one-bit partial product generation circuits 84 of i-th cells of all columns of the multiplier array 77 are coupled and connected to respective outputs of i-th decoder of multiplier bits 76, which second and third inputs are connected to inputs of respectively (2i−1)-th and (2i)-th bits of second operand vector 20 of said unit (where i=1,2, ..., N/2). Non inverted input of j-th AND gate with inverted input 75 is connected to third input of (j−1)-th decoder of multiplier bits 76 (where j=2, 3, ..., N/2). Input of each bit of third operand vector 21 of said unit is connected to second data input of the multiplexer 79 of the respective bit of the shift register 50, which first data input is connected to output of the AND gate with inverted inputs 78 of the same bit of the shift register 50, which first inverted input is connected to respective input of data boundaries setting for third operand vectors 24 of said unit. Second inverted input of the AND gate with inverted inputs 78 of q-th bit of the shift register 50 is connected to first inverted input of the AND gate with inverted inputs 78 of (q−1)-th bit of the shift register 50 (where q=2, 3, ..., N). Non inverted input of AND gate with inverted inputs 78 of r-th bit of the shift register 50 is connected to trigger 80 output of (r−2)-th bit of the shift register 50 (where r=3, 4, ..., N). Control inputs of multiplexers 79 of all shift register 50 bits are coupled and connected to first input of load control of third operand vectors into the first memory block 25 of said unit. Clock inputs of triggers 80 of all shift register 50 bits and input of the delay element 51 are coupled and connected to second input of load control of third operand vectors into the first memory block 26 of said unit. Output of the multiplexer 79 of each shift register 50 bit is connected to data input of the trigger 80 of the same bit of the shift register 50, which output is connected to data input of the first trigger 81 of the last cell of the respective column of the multiplier array 77. Output of the first trigger 81 of j-th cell of each multiplier array 77 column is connected to data input of the first trigger 81 of (j−1)-th cell of the same multiplier array 77 column (where j=2, 3, ..., N/2). Clock inputs of the first triggers 81 of all multiplier array 77 cells are coupled and connected to output of the delay element 51. Clock inputs of the second triggers 82 of all multiplier array 77 cells are coupled and connected to input of reload control of third operand matrix from the first memory block to the second memory block 27 of said unit. Second data input of the one-bit partial product generation circuit 84 of i-th cell of q-th multiplier array 77 column is connected to output of the AND gate with inverted input 83 of i-th cell of (q−1)-th multiplier array 77 column (where i=1, 2, ..., N/2 and q=2, 3, ..., N). Second input of the one-bit adder 85 of j-th cell of each multiplier array 77 column is connected to sum output of the one-bit adder 85 of the (j−1)-th cell of the same multiplier array 77 column (where j=2, 3, ..., N/2). Third input of the one-bit adder 85 of j-th cell of q-th multiplier array 77 column is connected to output of the multiplexer 86 of (j−1)-th cell of(q−1)-th multiplier array 77 column (where j=2, 3, ..., N/2 and q=2, 3, ..., N), and third input of the one-bit adder 85 of j-th cell of the first multiplier array 77 column is connected to third output of (j−1)-th decoder of multiplier bits 76 (where j=2, 3, ..., N/2).

Sum output of the one-bit adder 85 of the last cell of each multiplier array 77 column is output of the respective bit of first summand vector of results 28 of said unit. Output of the multiplexer 86 of the last cell of (q−1)-th multiplier array 77 column is output of q-th bit of second summand vector of results 29 of said unit (where q=2, 3, ..., N), which first bit of second summand vector of results 29 is connected to third output of (N/2)-th decoder of multiplier bits 76. Second inverted and non inverted inputs of the AND gate with inverted inputs 78 of the first bit and non inverted input of the AND gate with inverted inputs 78 of the second bit of the shift register, second data inputs of the one-bit partial product generation circuits 84 of all cells of the first column of the multiplier array 77, third inputs of one-bit adders 85 of first cells of all multiplier array 77 columns and non inverted input of the first AND gate with inverted input 75 are coupled and connected to "0". In each multiplier array 77 cell the output of the first trigger 81 is connected to data input of the second trigger 82, which output is connected to non inverted input of the AND gate with inverted input 83 and to first data input of the one-bit partial product generation circuit 84, which third control input is connected to second data input of the multiplexer 86, which first data input is connected to carry output of the one-bit adder 85 of the same cell of the multiplier array 77.

The calculation unit is aimed to generate a partial product of the multiplication of the second operand vector $Y=(Y_1 Y_2 \ldots Y_K)$, which bits are supplied to inputs 20 of said unit, by the third operand matrix $$Z = \begin{pmatrix} Z_{1,1} & Z_{1,2} & \cdots & Z_{1,M} \\ Z_{2,1} & Z_{2,2} & \cdots & Z_{2,M} \\ \vdots & \vdots & & \vdots \\ Z_{K,1} & Z_{K,2} & \cdots & Z_{K,M} \end{pmatrix},$$

previously loaded and stored in the second memory block of said unit, with addition to the obtained product of the first operand vector $X=(X_1 X_2 \ldots X_M)$, which bits are supplied to inputs 19 of said unit. In each clock cycle on outputs 28 and 29 of said unit bits of $A=(A_1 A_2 \ldots A_M)$ and $B=(B_1 B_2 \ldots B_M)$ vectors are generated, which sum is the result of the operation $X+Y\times Z$. I.e. the sum of the m-th elements of vectors A and B is defined by the following expression:

$$A_m + B_m = X_m + \sum_{k=1}^{K} Y_k \times Z_{k,m} (m = 1, 2, \ldots, M).$$

Vector X is an N-bit word of M packed data in two's complement presentation, which are elements of this vector.

And the last significant bits of vector X are bits of the first datum $X_1$, then bits of the second datum $X_2$ are followed, etc. The most significant bits of vector X are bits of the M-th datum $X_M$. With such packing the v-th bit of the m-th datum $X_m$ is the $$\left(v + \sum_{\mu=1}^{m-1} N_\mu\right) - th$$

bit of vector X, where $N_m$—the word length of the m-th datum $X_m$ of vector X, $v=1,2,\ldots,N_m$, $m=1,2,\ldots,M$. The number of data M in vector X and the number of bits $N_m$ in each m-th datum $X_m$ of this vector ($m=1,2,\ldots,M$) may be any integer value from 1 to N. The only restriction is that the total word length of all the data, packed in one vector X, should be equal to its word length:

$$\sum_{m=1}^{M} N_m = N.$$

Vector Y is an N-bit word of K packed data in two's complement presentation, which are elements of this vector. Format of vector Y is the same as that of vector X. However, these vectors may differ in the number of elements and word length of separate data, packed in these vectors. The number of bits $N'_k$ in the k-th datum $Y_k$ ($k=1,2,\ldots,K$) of vector Y may be any integer value from 2 to N. The number of data K in vector Y may be any integer value from 1 to N/2. However, the total word length of all the data, packed in one vector Y, should be equal to its word length:

$$\sum_{k=1}^{K} N'_k = N.$$

The k-th row of matrix Z is a data vector $Z_k=(Z_{k,1}\ Z_{k,2}\ \ldots\ Z_{k,M})$, Where $k=1,2,\ldots,K$. And each of the vectors $Z_1, Z_2, \ldots Z_K$ should have the same format as that of vector X.

Vectors A and B, generated at the outputs 28 and 29 of said unit, have the same format as that of vector X.

Tuning of the calculation unit hardware to process vectors of the required formats is made by means of loading the N-bit control word H to the inputs of data boundaries setting for first operand vectors and result vectors 22 of said unit and the (N/2)-bit control word E to the inputs of data boundaries setting for second operand vectors 23 of said unit.

The value 1 of the n-th bit $h_n$ of the word H means that said unit will regard the n-th bit of each of the vectors X, $Z_1$, $Z_2$, . . . $Z_K$ as the most significant bit of the respective element of this vector. The number of bits with the value 1 in the word H is equal to the number of elements in each of the vectors X, $Z_1$, $Z_2$, . . . $Z_K$:

$$\sum_{n=1}^{N} h_n = M.$$

The value 1 of the i-th bit $e_i$ of the word E means that said unit will regard the i-th pair of bits of vector Y as a group of last significant bits of the respective element of this vector. The number of bits with the value 1 in the word E is equal to the number of elements in vector Y:

$$\sum_{i=1}^{N/2} e_i = K.$$

Before the described above operation may be executed, the procedure of loading the matrix Z to the second memory block of said unit, functions of memory cells of which are executed by the second triggers 82 of the multiplier array 77 cells, should be foregone. Said procedure executes at two stages.

At first per N/2 clock cycles matrix Z is transformed into matrix $$Z' = \begin{pmatrix} Z'_{1,1} & Z'_{1,2} & \cdots & Z'_{1,M} \\ Z'_{2,1} & Z'_{2,2} & \cdots & Z'_{2,M} \\ \vdots & \vdots & & \vdots \\ Z'_{N/2,1} & Z'_{N/2,2} & \cdots & Z'_{N/2,M} \end{pmatrix},$$

which is loaded to the first memory block of said unit. And the i-th row of matrix Z' is a data vector $Z'_i=(Z'_{i,1}\ Z'_{i,2}\ \ldots\ Z'_{i,M})$, which will be then multiplied by the i-th pair of bits of vector Y ($i=1,2,\ldots,N/2$). All vectors $Z'_1, Z'_2,\ldots,Z'_{N/2}$ have the same format as that of any of vectors $Z_1, Z_2,\ldots Z_K$. Matrix Z transforms into matrix Z' by replacement of the k-th row $Z_k$ ($k=1,2,\ldots,K$) of matrix Z with $N'_k/2$ rows $Z'_{I_{k-1}+1}, Z'_{I_{k-1}+2}, \ldots, Z'_{I_{k-1}+N'_k/2}$ of matrix Z', generated according to the expression:

$$Z'_{I_{k-1}+j}=Z_k \times 2^{2(j-1)}(j=1,2,\ldots,N'_k/2),$$

where $I_k$—the total number of J-bit pairs of bits in the k first operands of vector Y, which is equal to:

$$I_k = \sum_{v=1}^{k} N'_v/2.$$

From presented above expression it follows that $Z'_1=Z_1$, $Z'_{N'_1/2+1}=Z_2$, $Z'_{(N'_1+N'_2)/2+1}=Z_3$ and so on. I.e. all rows of the matrix Z will be present in the matrix Z', but, as a rule, at other positions.

Matrix Z is transformed into matrix Z' by means of the shift register 50, which has two operate modes. In the load mode the value 1 is applied to the control input 25 of said unit, and all multiplexers 79 of the shift register 50 begin to pass data vector bits, applied to the inputs 21 of said unit, to data inputs of triggers 80 of the shift register 50. In the shift mode the value 0 is applied to the control input 25 of said unit, and all multiplexers 79 of the shift register 50 begin to pass data from the outputs of the corresponding AND gate with inverted inputs 78 of the shift register 50 to data inputs of triggers 80 of the shift register 50. At the output of the AND gate with inverted inputs 78 of the r-th bit (r3,4, . . . ,N) of the shift register 50 the signal $W_{r-2}\ \overline{Uh_r}\ \overline{Uh_{r-1}}$ is generated, where $w_{r-2}$—data, stored in the trigger 80 of the (r−2)-th bit of the shift register 50, and $h_r$—the value of the r-th bit of the N-bit control word H, which is applied to the inputs 24 of said unit and sets data boundaries in the processing vectors. The AND gates with inverted inputs 78 prevents propagation of data between the shift register 50 bits, storing bits of different elements of data vector, which is previously loaded to the shift register 50. At the output of the AND gate with inverted inputs 78 of the two last significant bits of the shift register signals of the value 0 are constantly generated, because their non inverted inputs are connected to "0". Thus, the shift register 50, which is in the shift mode, performs the arithmetic shift of two bits left on the data vector, stored in it, what is equivalent to the multiplication of this vector by four.

Matrix Z is transformed into matrix Z'per N/2 clock cycles. In each of these N/2 clock cycles a clock signal is applied to the control input 26 of said unit, and this clock signal supplies clock inputs of the triggers 80 of the shift register 50, and described above N-bit control word H is continuously applied to inputs of data boundaries setting for third operand vectors 24 of said unit, and this control word will supplies inputs 22 of said unit at execution of the X+Y' Z operation after matrix Z load. At the i-th clock cycle (i=1,2, . . . ,N/2) the i-th bit $e_i$ of the described above (N/2)-bit control word E is applied to the control input 25 of said unit, and this control word will supplies inputs 23 of said unit at execution of the X+Y' Z operation after matrix Z transform and load.

At the $(I_{k-1}+1)$-th clock cycle k=1,2, . . . ,K), when a bit of the word E of the value 1 is applied to the input 25 of said unit, bits of vector $Z_k$, are applied to the inputs 21 of said unit, and this vector will be written to the triggers 80 of the shift register 50 without changes. At each of the rest N/2-K clock cycles, when a bit of the word E of the value 0 is applied to the input 25 of said unit, four-times increased values of elements of the data vector, stored in the shift register 50, will be written to the triggers 80 of the shift register 50.

Thus, when the i-th clock cycle (i=1,2, . . . ,N/2) of the process of matrix Z transform into matrix Z' is finished, vector $Z'_i$ will be stored in the triggers 80 of the shift register 50.

Data from the outputs of the shift register 50 applies to data inputs of the first memory block 52 of said unit, which is implemented by the first triggers 81 of the multiplier array 77 cells. The matrix of N by N/2 triggers 81 comprises N parallel connected (N/2)-bit shift registers, each of them consists of N/2 serially connected triggers 81, included into cells of one of the multiplier array 77 columns. So the matrix of triggers 81 can be considered as a memory block with sequential input port, containing N/2 memory cells, each of them provides storage of N-bit words. Functions of the i-th cell of the first memory block are executed by triggers 81 of the cells of i-th row of the multiplier array 77 (i=1,2, . . . ,N/2).

The clock signal, applied to the input 26 of said unit at each clock cycle during the whole process of matrix Z transform into matrix Z', pass through the delay element 51, which may be a usual inverter gate, to clock inputs of the first triggers 81 of all multiplier array 77 cells. So matrix Z' loading to the first memory block of said unit will take place simultaneously with matrix Z transformation into matrix Z'. At the end of the loading process vector $Z'_i$ will be stored in the first triggers 81 of the i-th row of the multiplier array 77 (i=1,2, . . . ,N/J).

After that clock signal is applied to the control input 27 of said unit per one clock cycle, and due to this signal the contents of the first triggers 81 of all cells of the multiplier array 77 is rewritten to the second triggers 82 of the same cells of the multiplier array 77. The matrix of N by N/2 triggers 82 can be considered as a second memory block, containing N/2 memory cells, each of them provides storage of N-bit words. Functions of the i-th cell of the second memory block are executed by triggers 82 of the cells of i-th row of the multiplier array 77 (i=1,2, . . . ,N/2). Thus, matrix Z' is moved from the first to the second memory block of said unit per one clock cycle.

Starting from the next clock cycle the executive unites of the calculation unit, which are AND gates with inverted input 75, decoders of multiplier bits 76 and also included into cells of the multiplier array 77 AND gates with inverted input 83, one-bit partial product generation circuits 84, one-bit adders 85 and multiplexers 86 will perform the described above operation in each clock cycle $$A+B=X+Y\times Z.$$

In this case the i-th decoder of multiplier bits 76, the i-th AND gate with inverted input 75 and included into cells of i-th row of the multiplier array 77 AND gates with inverted input 83 and circuits 84 are used to generate bits of the partial product of the multiplication of vector $Z'_i$, stored in the second triggers 82 of cells of the i-th row of the multiplier array, by the i-th pair of bits $Y'_i$ of vector Y (hereafter i=1,2, . . . ,N/2):

$$P_i = Z'_i \times Y'_i.$$

All partial products are calculated on the basis of modified Booth's algorithm, according of that the values of 2i-th and (2i–1)-th bits of vector Y and carry signal $c_i$ from neighbouring low-order pair of multiplier bits determine the value of the partial product $P_i$ as follows:

if $y_{2i}=0$, $y_{2i-1}=0$ and $c_i=0$ or $y_{2i}=1$, $y_{2i-1}=1$ and $c_i=1$, then $P_i=0$;

if $y_{2i}=0$, $y_{2i-1}=0$ and $c_i=1$ or $y_{2i}=0$, $y_{2i-1}=1$ and $c_i=0$, then $P_i=Z'_i$;

if $y_{2i}=0$, $y_{2i-1}=1$ and $c_i=1$, then $P_i=2\times Z'_i$;

if $y_{2i}=1$, $y_{2i-1}=0$ and $c_i=0$, then $P_i=-2\times Z'_i$;

if $y_{2i}=1$, $y_{2i-1}=0$ and $c_i=1$ or $y_{2i}=1$, $y_{2i-1}=1$ and $c_i=0$, then $P_i=-Z'_i$;

In usual two-operand multipliers, operated on the basis of Booth's algorithm, the (2i–2)-th multiplier bit is used as the carry signal $c_i$ In the offered unit, where the multiplicand is vector of programmable word length operands, the carry signal $c_i$ is generated at the output of the i-th AND gate with inverted input 75 and described as follows:

$$c_i = y_{2i-2} \cap \overline{e_i},$$

where $y_{2i-2}$—(2i–2)-th bit of vector Y, $e_i$—i-th bit of the control word E. Usage of AND gates with inverted input 75 allows to lock the carry propagation between to pairs of bits of vector Y, which are included to different elements of the vector.

At outputs of i-th decoder of multiplier bits 76 following signals are generated:

$$one_i = y_{2i-1} \oplus c_i, \ two_i = \overline{y_{2i-1} \oplus c_i} \cap y_{2i-1} \oplus y_{2i}, \ sub_i = y_{2i}.$$

These signals control the one-bit partial product generation circuits 84 of cells of i-th row of multiplier array 77, to first data inputs of which from outputs of the second triggers 82 of cells of i-th row of multiplier array 77 bits of $Z'_i$ are applied, and to second data inputs from outputs of AND gates with inverted input 83 of cells of i-th row of multiplier array 77 bits of $Z''_i$ are applied. The AND gate with inverted input 83 of i-th cell of nth multiplier array 77 column generates (n+1)-th bit $Z''_{i,n+1}$ of vector $Z''_i$ in accordance with following expression $$z_{i,n+1} = z'_{i,n} \cap \overline{h_n},$$

where $z'_{i,n}$—n-th bit of vector $Z'_i$, stored in the trigger 82 of i-th cell of n-th multiplier array 77 column, $h_n$—n-th bit of control word H ($i=1,2,\ldots,N/2$ and $n=1,2,\ldots,N$). From said expression it follows that vector $Z''_i$ is equal to $2 \times Z'_i$ and has the same format as that of vector $Z'_i$.

And gates 90 and 91 and OR gate 92, which are elements of the one-bit partial product generation circuits 84 of cells of i-th row of multiplier array 77, operate as N-bit switch, to which outputs when $one_i=1$ and $two_i=0$ vector $Z'_i$ passes, when $one_i=1$ and $two_i=0$—vector $Z''_i$, and when $one_i=0$ and $two_i=0$—vector with the value 0 in each its bit. Thus, at outputs of said switch a vector $P'_i$ is generated, which is equal to partial product vector $P'_i$ when $sub_i=0$, and to $-P_i$ when $sub_i=1$.

Changing of the sign of each element of vector $P'_i$, necessary to obtain vector $P_i$ when $sub_i=1$, may be executed by means of inverting of each bit of vector $P'_i$ and addition the value 1 to each element of inverted vector. The EXCLUSIVE OR gates 93, which are elements of the one-bit partial product generation circuits 84 of cells of i-th row of multiplier array 77, operate as inverters, controlled by signal $sub_i$. When $sub_i=0$, vector $P'_i$ pass through the EXCLUSIVE OR gates 93 to outputs of the one-bit partial product generation circuits 84 of cells of i-th row of multiplier array 77 without changes. When $sub_i=1$, the EXCLUSIVE OR gates 93 invert each bit of this vector. Thus, at outputs of the one-bit partial product generation circuits 84 of cells of i-th row of multiplier array 77 a N-bit vector $P''_i$ is generated, which has the same format as that of vectors X, $Z'_1, Z'_2, \ldots, Z'_{N/2}$ and satisfies the expression:

$$P''_i + SUB_i = P_i,$$

where $SUB_i$—N-bit vector, m-th element of which is $N_m$-bit operand ($00\ldots0\ sub_i$)b, which last significant bit is equal to $sub_i$, and rest bits have the value 0 each.

The one-bit adders 85 and the multiplexers 86 of cells of the multiplier array 77 are used to generate a partial product of the summation of vectors X, $P''_1, P''_2, \ldots, P''_{N/2}, SUB_1, SUB_2, \ldots, SUB_{N/2}$. In said unit the summation only is executed by means of one-bit adders 85, as in usual $N/2+1$ operand summation circuits, designed on the basis of carry save adders. The multiplexers 86 are used for replacement of the carry signals between columns of one-bit adders 85, executed the summation of different elements of vectors, with the signals $sub_1, sub_2, \ldots, sub_{N/2}$. If (q-1)-th bit $h_{q-1}$ of the control word H is equal to the value 0, then the multiplexers 86 of cells of (q-1)-th multiplier array 77 column pass the signals from carry outputs of one-bit adders 85 of cells of (q-1)-th column of the multiplier array 77 to respective inputs of one-bit adders 85 of cells of q-th column of the multiplier array 77 ($q=2,3,\ldots,N$). If (q-1)-th bit $h_{q-1}$ of the control word H is equal to the value 1, then the multiplexers 86 of cells of (q-1)-th multiplier array 77 column pass the signals $sub_1, sub_2, \ldots, sub_{N/2}$ from outputs of decoders of multiplier bits 76 to respective inputs of one-bit adders 85 of cells of q-th column of the multiplier array 77 ($q=2,3,\ldots,N$). As a result of this at the outputs 28 and 29 of the said unit vectors A and B are generated and their sum is equal to $$A + B = X + \sum_{i=1}^{N/2}(P''_i + SUB_i) = X + \sum_{i=1}^{N/2} P_i = X + \sum_{i=1}^{N/2} Y'_i \times Z'_i.$$

Having grouped the partial products, referring to separate elements of vector Y, the last expression may be presented in the following form $$A + B = X + \sum_{k=1}^{K}\sum_{j=1}^{N'_k/2} Y'_{I_{k-1}+j} \times Z'_{I_{k-1}+j} = X + \sum_{k=1}^{K}\sum_{j=1}^{N'_k/2} Y'_{I_{k-1}+j} \times Z_k \times 2^{2(j-1)}.$$

Taking into account the fact that every k-th element of vector Y is equal to $$Y_k = \sum_{j=1}^{N'_k/2} Y'_{I_{k-1}+j} \times 2^{2(j-1)},$$

the previous expression will be transformed as follows:

$$A + B = X + \sum_{k=1}^{K} Y_k \times Z_k.$$

Thus, the partial product of the operation $X+Y \times Z$ is generated at the outputs 28 and 29 of said unit.

The calculation unit is oriented to package processing of data vectors, with that the set of input operands vectors, applied sequentially to each of the inputs 19 and 20 of said unit is split into successively processed subsets (packages). The set of input operands vectors, applied to each of the inputs 19 and 20 of said unit and included to the τ-th package, can be presented in the form of a vector of data vectors:

$$X^\tau \begin{pmatrix} X^{\tau,1} \\ X^{\tau,2} \\ \vdots \\ X^{\tau,T_\tau} \end{pmatrix}, Y^\tau = \begin{pmatrix} Y^{\tau,1} \\ Y^{\tau,2} \\ \vdots \\ Y^{\tau,T_\tau} \end{pmatrix},$$

where $T_\tau$—the number of vectors, included into every τ-th package. And all vectors in one package should have the same format, i.e. the information, applied to control inputs 22 and 23 of said unit, should remain unchanged during one package processing.

Processing of the τ-th packages $X^\tau$ and $Y^\tau$ is executed per $T_\tau$ clock cycles. And at the t-th clock cycle the calculation unit executes the operation $$A^{\tau,t}+B^{\tau,t}=X^{\tau,t}+Y^{\tau,t} \times Z^\tau (t=1,2,\ldots,T_\tau),$$

where $Z^\tau$—the contents of the second memory block of said unit, which should remain unchanged during the τ-th packages $X^\tau$ and $Y^\tau$ processing.

Simultaneously with the τ-th vector package processing the described above procedure of successive loading of vectors $Z_1^{\tau+1}, Z_2^{\tau+1}, \ldots, Z_K^{\tau+1}$ from inputs 21 of said unit to the first memory block of said unit. This procedure occupies $N/2$ clock cycles.

When both of the mentioned processes are complete, an active signal, initiating move of matrix $Z^{\tau+1}$ from the first to the second memory block of said unit, is applied to the neural processor control input 27. Said move is executed per one clock cycle. After that said unit will process (τ+1)-th packets of vectors $X^{\tau+1}$ and $Y^{\tau+1}$ and will load matrix $Z^{\tau+2}$.

The number of vectors $T_\tau$ in each τ-th package may be set in program mode. And it is not expedient to use packages of vectors with $T_\tau$ less than $N/J+2$, because in this case the neural processor computing facilities are not used efficiently.

The adder circuit, which block diagram is presented in FIG. 9, has inputs of bits of first summand vector 31 and of second summand vector 32, inputs of data boundaries setting for summand vectors and sum vectors 33 and outputs of bits of sum vector 34. Each of N bits 94 of the adder circuit comprises a half-adder 95, an EXCLUSIVE OR gate 96, first 97 and second 98 AND gates with inverted input. Also the adder circuit includes a carry look-ahead circuit 99.

Inputs of bits of first summand vector 31 of the adder circuit and inputs of bits of second summand vector 32 of the adder circuit are connected respectively to first and second inputs of the half-adders 95 of bits 94 of the adder circuit. Inverted inputs of first 97 and second 98 AND gates with inverted input of each bit 94 of the adder circuit are coupled and connected to respective input of data boundaries setting for summand vectors and sum vectors 33 of the adder circuit. Outputs of the EXCLUSIVE OR gates 96 of bits 94 of the adder circuit are outputs of bits of sum vector 34 of the adder circuit. Output of the first AND gate with inverted input 97 of each bit 94 of the adder circuit is connected to carry propagation input through the respective bit of the carry look-ahead circuit 99, which carry generation input in each bit is connected to output of the second AND gate with inverted input 98 of the respective bit 94 of the adder circuit. Second input of the EXCLUSIVE OR gate 96 of q-th bit 94 of the adder circuit is connected to output of the carry to q-th bit of the carry look-ahead circuit 99 (where q=2, 3, . . . , N), which initial carry input and second input of the EXCLUSIVE OR gate 96 of the first bit 94 of the adder circuit are connected to "0". In each bit 94 of the adder circuit sum output of the half-adder 95 is connected to first input of the EXCLUSIVE OR gate 96 and to non inverted input of the first AND gate with inverted input 97, and carry output of the half-adder 95 is connected to non inverted input of the second AND gate with inverted input 98.

The adder circuit operates as follows.

Bits of the first summand vector $A=(A_1 A_2 \ldots A_M)$ are applied to the inputs 31 of the adder circuit. Vector A is an N-bit word of M packed data in two's complement presentation, which are elements of this vector. And last significant bits of vector A are bits of the first datum $A_1$, then bits of the second datum $A_2$ follow, etc. Most significant bits of vector A are bits of the M-th datum $A_M$. With such packing the v-th bit of the m-th datum $A_M$ is the $$\left(v + \sum_{\mu=1}^{m-1} N_\mu\right) - th$$

bit of vector A, where $N_m$—the word length of the m-th datum $A_M$ of vector A, $v=1,2, \ldots, N_m$, $m=1,2, \ldots, M$. The number of data M in vector A and the number of bits $N_m$ in each m-th datum $A_m$ of this vector may be any integer value from 1 to N (m=1,2, . . . ,M). The only restriction is that the total word length of all the data, packed in one vector A, should be equal to its word length:

$$\sum_{m=1}^{M} N_m = N.$$

Bits of the second summand vector $B=(B_1 B_2 \ldots B_M)$ are applied to the inputs 32 of the adder circuit, and this vector has the same format as that of vector A.

Tuning of the adder circuit hardware to process vectors of the required formats is made by means of loading the N-bit control word H to its inputs 33. And the value 1 of the n-th bit $h_n$ of the word H means that the adder circuit will regard the n-th bit of each of the vectors A and B as the most significant bit of the corresponding element of this vector. The number of bits with value 1 in the word H is equal to the number of elements in each of the vectors A and B (hereafter n=1,2, . . . ,N):

$$\sum_{n=1}^{N} h_n = M.$$

In n-th bit 94 of said circuit n-th bit $a_n$ of vector A and n-th bit $b_n$ of vector B are applied to inputs of the half-adder 95. At sum and carry outputs of this half-adder 95 auxiliary signals of carry propagation $p_n$ and carry generation $g_n$ are generated for this bit of the adder circuit:

$$p_n = a_n \mathring{A} b_n, g_n = a_n U b_n.$$

Signals $p_n$ and $g_n$ supply non inverted inputs respectively of fist 97 and second 98 AND gates with inverted input, to inverted inputs of which n-th bit $h_n$ of control word H is applied. If n-th bits $a_n$ and $b_n$ of vectors A and B are not sign bits of separate elements, composing these vectors, then $h_n=0$ and signals $p_n$ and $g_n$ pass to outputs of AND gates with inverted input 97 and 98 without changes. If n-th bits $a_n$ and $b_n$ of vectors A and B are sign bits of its elements, then $h_n=1$ and signals with the value 0 are set to outputs of AND gates with inverted input 97 and 98. Thus, AND gates with inverted input 97 and 98 are used to lock signals of carry propagation and of carry generation in those bits 94 of said circuit, which process most significant bits of separate elements of input vectors A and B.

Signals from outputs of AND gates with inverted input 97 and 98 apply to carry propagation and carry generation inputs of circuit 99, which is used to accelerate carry signals generation to separate bits of the adder circuit. Any known sequential, group or look-ahead carry generation circuit, applied in usual two operand adders, may be used as the circuit 99. At outputs of the circuit 99 signals of the carry to separate bits of the adder circuit are generated in accordance with following expression $c_{n+1} = g_n \mathring{U} p_n \mathring{U} c_n$. So if $h_n=1$ then $p_n = g_n = 0$ and the circuit 99 will generate the signal $c_{n+1}=0$.

Carry signals, generated by the circuit 99, apply to inputs of the EXCLUSIVE OR gates 96 of respective bits 94 of the adder circuit, to other inputs of which the signals of carry propagation apply from sum outputs of the half-adder 95. At output of the EXCLUSIVE OR gates 96 of each n-th bit 94 of the adder circuit the signal $s_n = p_n \mathring{A} c_n$ is generated. Thus, at outputs 34 of the adder circuit a vector $S=(S_1 S_2 \ldots S_M)$ is generated, which each element is equal to the sum of the respective elements of vectors A and B:

$$S_m = A_m + B_m (m=1,2, \ldots, M).$$

And vector S will have the same format as that of vectors A and B.

Industrial Applicability

Achievable technical result of the invention lies in increasing of the neural processor performance by means of the ability to change in program mode as word lengths of input operands, as word lengths of results.

The peculiarity of the offered neural processor is that the user can set the following neural network parameters in program mode: the number of layers, the number of neurons and neural inputs in each layer, the word length of data at each neural input, the word length of each weight coefficient, the word length of output value of each neuron, the saturation function parameter for each neuron.

One neural processor can emulate a neural network of a practically unlimited size. A neural network is emulated per layer (sequentially layer-by-layer).

Every neural network layer is divided to sequentially processed fragments. Each fragment is executed per one clock cycle. With reducing the word length of input data and of weight coefficients lager fragment of neural network is executed per one clock cycle. A few neural processors may be used to emulate one neural network, which allows to reduce the duration of emulation process by a few times.

Achievable technical result may be intensified by means of the decreasing of the clock cycle time by inserting input data registers in each saturation unit, in the calculation unit and in the adder circuit. These registers operate as pipeline registers, which allow to decrease the neural processor clock cycle time practically by three times.

The neural processor executive units are saturation units, a calculation unit and an adder circuit. Each executive unit executes operations over vectors of programmable word length data. In addition these executive units may be used as in the offered neural processor, as and in other units of vector data processing.

Achievable technical result of the invention lies in increasing of the saturation unit performance by means of the ability to process vector of input operands with programmable word length at a time. In the saturation unit carry look-ahead and carry propagation circuits are used, and as a result of that the propagation delay of said unit is approximately equal to the propagation delay of a usual two-operand adder.

Achievable technical result of the invention lies in the expansion of the calculation unit functionality. Said unit may execute the multiplication of matrix of data by vector of programmable word length data. This operation is executed per one clock cycle, which period is equal to the propagation delay of a usual two operand array multiplier.

Achievable technical result of the invention lies in increasing of the adder circuit performance by means of including arithmetic operations over vectors of programmable word lengths data into its operation set. In contradistinction to known data vector adders, in the offered adder circuit the lock of signals of the carry between bits of the adder circuit, processed neighboring operands of input vectors, is implemented on the level of forming the auxiliary functions of carry generation and carry propagation. That allows in the adder circuit to use carry propagation circuits, applied in usual two-operand adders. So the offered adder circuit, destined for the summation of vectors of programmable word length data, has practically the same propagation delay as for two operand adders.

The offered neural processor can be efficiently used for calculation of recursive and non recursive convolutions, for execution of Hadamard Transform, Fast and Discrete Fourier Transforms, and also for execution of other digital signal processing algorithms.

The neural processor may be implemented as an independent microcircuit or as a co-processor in computer systems.

What is claimed is:

1. A neural processor, comprising:
   a first register;
   a second register;
   a third register;
   a fourth register;
   a fifth register;
   a sixth register;
   a first FIFO;
   a second FIFO;
   a multiplexer;
   a shift register;
   an AND gate;
   a 3-to-2 switch;
   a first saturation unit;
   a second saturation unit;
   an adder circuit;
   a calculation unit;
   an output bus;
   a first input bus; and
   a second input bus,
   wherein a first data input of every bit of the second register, the third register, the first FIFO, and the multiplexer is connected to an output of a respective bit of the first register,
   wherein a data input of every bit of the second register is connected to a respective bit of the first input bus,
   wherein control inputs of the first, second and third registers are respective control inputs of the neural processor,
   wherein inputs of first operand vector bits, inputs of second operand vector bits, inputs of third operand vector bits, inputs of a data boundaries setting for the first operand vectors and result vectors, inputs of a data boundaries setting for the second operand vectors, inputs of a data boundaries setting for the third operand vectors, first and second inputs of a load control of the third operand vectors are stored into a first memory block,
   wherein an input of a reload control of a third operand matrix from the first memory block to a second memory block, and outputs of bits of first and second summand vectors of results of an addition of the first operand vector and a product of a multiplication of the second operand vector by a third operand matrix are stored into the second memory block,
   wherein first data inputs of bits of the 3-to-2 switch, data inputs of the first FIFO, data inputs of the first, third and fourth registers and parallel data inputs of the shift register are coupled in a bit-by-bit manner and connected to the respective bits of the first input bus,
   wherein each bit of the second input bus is connected to second data input of the respective bit of the 3-to-2 switch,
   wherein a first output of each bit is connected to an input of the respective bit of an input operand vector of the first saturation unit,
   wherein a control input of every bit is connected to an output of the corresponding bit of the second register, a second output of each bit of the 3-to-2 switch being connected to an input of the respective bit of an input operand vector of the second saturation unit,
   wherein a control input of each bit is connected to an output of a respective bit of the third register, an output of each bit of a result vector of the first saturation unit being connected to a second data input of a respective bit of the multiplexer,
   wherein the output of each bit is connected to an input of the respective bit of a first operand vector of the calculation unit,
   wherein an input of each bit of the second operand vector is connected to an output of the respective bit of a result vector of the second saturation unit, data outputs of the first FIFO being connected to inputs of the respective bits of a third operand vector of the calculation unit, wherein an output of each bit of a first summand vector of results of the addition of the first operand vector and the product of the multiplication of the second operand vector by third operand matrix stored into the second memory block is connected to an input of a respective bit of a first summand vector of the adder circuit, wherein an input of each bit of a second summand vector is connected to an output of respective bit of the second summand vector of the results of the addition of the first operand vector and the product of the multiplication of the second operand vector by the third operand matrix, stored into the second memory block, wherein each input of the data boundaries setting for the first operand vectors and the result vectors is connected to an output of a respective bit of the fifth register and to the respective input of the data boundaries setting for the summand vectors and the sum vectors of the adder circuit, wherein the output of each bit of the sum vectors is connected to a respective data input of the second FIFO, wherein each data output is connected to a respective bit of the output bus and to a third input of the respective bit of the 3-to-2 switch, an output of each bit of the fourth register being connected to the data input of the respective bit of the fifth register and to the respective input of the data boundaries setting for the third operand vectors of the calculation unit, wherein each input of the data boundaries setting for the second operand vectors is connected to an output of a respective bit of the sixth register, wherein the data input of each bit is connected to an output of the respective bit of the shift register, wherein a sequential data input and the output are coupled to a first input of the load control of the third operand vectors into the first memory block of the calculation unit and to a first input of the AND gate, wherein an output is connected to a read control input of the first FIFO, a second input of the AND gate, a shift control input of the shift register and a second input of the load control of the third operand vectors being coupled and connected to the respective control input of the neural processor, wherein the input of the reload control of the third operand matrix from the first memory block to the second memory block of the calculation unit and the control inputs of the fifth and sixth registers are coupled and connected to the respective control input of the neural processor, wherein the control inputs of the switch, the control inputs of the multiplexer and the control inputs of the fourth register, write control inputs of the shift register, the control inputs of the first FIFO and read and write control inputs of the second FIFO are respective control inputs of the neural processor, and wherein state outputs of the first and second FIFOs are state outputs of the neural processor.

2. The neural processor according to claim 1, wherein the calculation unit includes a further shift register, a delay element, the first memory block, the second memory block and a vector adding circuit, wherein the shift register performs an arithmetic shift of J bits left on all N-bit vector operands which are stored in the shift register, wherein J is a minimal value that is an aliquot part of data word lengths in the second operand vectors of the calculation unit, wherein the first memory block includes a sequential input port and N/J cells to store N-bit data, wherein the second memory block includes the N/J cells to store the N-bit data as N/J multiplier blocks, each of the N/J multiplier blocks multiplying an N-bit vector of the programmable word length data by a J-bit multiplier, wherein the vector adding circuit generates a partial product of a summation of N/J+1 programmable word length data vectors, wherein the inputs of the third operand vector bits of the calculation unit are connected to data inputs of the shift register, wherein the outputs of each N/J cell are connected to the data inputs of the first memory block, to the data inputs of the respective cell of the second memory block, and to the inputs of multiplicand vector bits of the respective multiplier block, wherein the inputs of the multiplier bits are connected to the inputs of a respective J-bit group of second operand vector bits of the calculation unit, the outputs of each multiplier block being connected to input bits of the respective summand vector of the vector adding circuit, wherein inputs of (N/J+1)-th summand vector bits are connected to inputs of the first operand vector bits of the calculation unit, wherein inputs of the data boundaries setting for the third operand vectors are connected to the respective inputs of the data boundaries setting for operand vectors of the shift register, wherein a mode select input is connected to a first input of the load control of the third operand vectors into the first memory block of the calculation unit, wherein the second input of the load control of the third operand vectors into the first memory block is connected to a clock input of the shift register and to an input of the delay element, wherein the output of the load control is connected to a write control input of the first memory block, a write control input of the second memory block being connected to an input of the reload control of the third operand matrix from the first memory block to the second memory block of the calculation unit, wherein every input of the data boundaries setting for the second operand vectors is connected to an input of a sign correction of the respective multiplier block, the inputs of the data boundaries setting for the first operand vectors and the result vectors of the calculation unit are connected to the inputs of the data boundaries setting for the multiplicand vectors and the result vectors of each multiplier block and to the inputs of the data boundaries setting for the summand vectors and the result vectors of the vector adding circuit, and wherein the outputs of bits of the first and second summand vectors of the results are respective outputs of the calculation unit.

3. The neural processor according to claim 1, wherein each of the first and second saturation units includes a saturation input data register having data inputs which are inputs of respective bits of an input operand vector of each of the first and second saturation units, wherein the calculation unit includes a calculation input data register having data inputs which are inputs of respective bits of the first and second operand vectors of the calculation unit, and wherein the adder circuit includes an adder input data register having data inputs which are inputs of respective inputs of the adder circuit.

4. A saturation unit, comprising:

a first multiplexer for a saturation in each of N bits of the saturation unit, a data input being connected to an input of a respective bit of an input operand vector of the saturation unit, an output of each bit of a result vector being connected to an output of the first multiplexer of the respective bit of the saturation unit, a carry propagation circuit;

a carry look-ahead circuit;

a second multiplexer;

an EXCLUSIVE OR gate;

an EQUIVALENCE gate;

a NAND gate; and an AND gate having an inverted input and a non inverted input which has an inverted input, wherein first inputs of the NAND gate and the EQUIVALENCE gate of the saturation unit are coupled to the respective control input of the saturation unit, an n-th bit output of the NAND gate of the saturation unit being connected to an input of the carry propagation circuit through an (N−n+1)-th bit of the carry look-ahead circuit, wherein an output of a carry to an (N−n+2)-th bit is connected to:

the control input of the first multiplexer of n-th bit of the saturation unit, an output and the non-inverted input of the AND gate being connected to the control input of the second multiplexer of the same bit of the saturation unit, a carry generation input of an (N−n+1)-th bit of the carry look-ahead circuit, and an inverted input of the carry propagation through an (N−n+1)-th bit of the carry propagation circuit, wherein a carry input from the (N−n+1)-th bit is connected to the output of the second multiplexer of an n-th bit of the saturation unit, n being equal to 1,2, . . . , N, wherein a first input of the EXCLUSIVE OR gate and the non inverted input of the AND gate with inverted input of q-th bit of the saturation unit are respectively connected to a second input of the EXCLUSIVE OR gate and to the inverted input of the AND gate with an inverted input of an (q−1)-th bit of the saturation unit, wherein the first data input of the second multiplexer is connected to an output of the carry propagation circuit to (N−q+2)-th bit of the carry propagation circuit, q being equal to 2, 3, . . . , N, wherein initial carry inputs of the carry propagation circuit and initial carry inputs of the carry look-ahead circuit, the second input of the EXCLUSIVE OR gate, the inverted input of the AND gate with the inverted input and the first data input of the second multiplexer of N-th bit of the saturation unit are coupled and connected to "0", wherein, in each bit of the saturation unit, the output of the second multiplexer is connected to the second input of the EQUIVALENCE gate, wherein the output is connected to the first data input of the first multiplexer, wherein the second data input is connected to the second data input of the second multiplexer and a first input of the EXCLUSIVE OR gate, and wherein the output is connected to the second input of the NAND gate of the same bit of the saturation propagation circuit unit.

5. The saturation unit according to claim 4, wherein the output of the carry saturation propagation circuit to a q-th bit is connected to the carry input from a (q−1)-th bit in the carry propagation circuit, q being equal to 1, 2, . . . , N.

6. The saturation unit according to claim 4, wherein the carry look-ahead circuit includes further AND gates and further OR gates of quantity of N, each input of the carry propagation circuit through the respective bit of the carry propagation circuit being connected to a first input of the respective AND gate, and wherein the output is connected to a first input of the respective OR gate, a second input and the output being respectively connected to the carry generation input of the respective bit of carry propagation circuit and the output of the carry propagation circuit to the same bit of the carry propagation circuit, the second input of the first AND gate being an initial carry input of the carry propagation circuit, the second input of a q-th AND gate being connected to an output of the (q−1)-th OR gate, q being equal to 2,3, . . . , N.

7. A calculation unit, comprising:

N/2 decoders of multiplier bits;

a multiplier array of N columns by N/2 cells;

N/2 AND gates having an inverted input;

a delay element; and a N-bit shift register, wherein each of the N/2 decoders and the multiplier array includes a one-bit partial product generation circuit and an one-bit adder, respective control inputs of the one-bit partial product generation circuits of i-th cells of all columns of the multiplier array being coupled to respective outputs of i-th decoder of multiplier bits, i being equal to 1,2, . . . , N/2, a first input of a one-bit adder of each cell of the multiplier array being connected to an output of the one-bit partial product generation circuit of the same cell of the multiplier array, wherein each bit includes the AND gate having inverted inputs, a multiplexer and a trigger, each cell of the multiplier array incorporating first and second triggers which function as memory cells of respectively first and second memory blocks of the calculation unit, wherein the AND gate and an input of each bit of a first operand vector of the calculation unit are connected to a second input of the one-bit adder of the first cell of the respective column of the multiplier array, wherein control inputs of multiplexers and the inverted inputs of the AND gates with an inverted input of all cells of each column of which are coupled respective input of data boundaries setting for first operand vectors and for result vectors;

wherein each input of a data boundaries setting for second operand vectors is connected to the inverted input of the respective AND gate with inverted input, wherein the output is connected to first input of the respective decoder of multiplier bits, second and third inputs of an i-th decoder of the multiplier bits are connected to inputs of respectively (2i−1)-th and (2i)-th bits of the second operand vector of the calculation unit, being equal to 1, 2, ..., N/2, wherein a non inverted input of a j-th AND gate with inverted input is connected to a third input of (j−1)-th decoder of the multiplier bits, J being equal to 2, 3, ..., N/2, wherein an input of each bit of the third operand vector of the calculation unit is connected to the second data input of the multiplexer of the respective bit of the shift register, wherein the first data input is connected to output of the AND gate with the inverted inputs of the same bit of the shift register, wherein the first inverted input is connected to a respective input of the data boundaries setting for the third operand vectors of the calculation unit, the second inverted input of the AND gate with the inverted inputs of the q-th bit of the shift register being connected to first inverted input of the AND gate with inverted inputs of (q−1)-th bit of the shift register, q being equal to 2, 3, ..., N, wherein the non inverted input of the AND gate with inverted inputs of an r-th bit of the shift register is connected to a trigger output of (r−2)-th bit of the shift register, r being equal to 3, 4, ..., N, wherein the control inputs of the multiplexers of all shift register bits are coupled to the first input of the load control of the third operand vectors into the first memory block of the calculation unit, wherein clock inputs of the triggers of all shift register bits and the input of the delay element are coupled to a second input of the load control of the third operand vectors into the first memory block, the output of the multiplexer of each shift register bit being connected to a data input of the trigger of the same bit of the shift register, wherein the output is connected to a data input of the first trigger of the last cell of the respective column of the multiplier array, output of the first trigger of j-th cell of each multiplier array column being connected to the data input of the first trigger of a (j−1)-th cell of the same multiplier array column, j being equal to 2, 3, ..., N/2, wherein the clock inputs of the first triggers of all multiplier array cells are coupled and connected to the output of the delay element, the clock inputs of the second triggers of all multiplier array cells being coupled and connected to an input of a reload control of the third operand matrix from the first memory block to the second memory block, wherein the second data input of the one-bit partial product generation circuit of an i-th cell of an q-th multiplier array column is connected to the output of the AND gate with inverted input of an i-th cell of a (q−1)-th multiplier array column, i being equal to 1, 2, ..., N/2, q being equal to 2, 3, ..., N, wherein the second input of the one-bit adder of j-th cell of each multiplier array column is connected to a sum output of the one-bit adder of the (j−1)-th cell of the same multiplier array column, j being equal to 2, 3, ..., N/2, wherein the third input of the one-bit adder of the j-th cell of the q-th multiplier array column is connected to the output of the multiplexer of (j−1)-th cell of (q−1)-th multiplier array column, being equal to 2, 3, ..., N/2, being equal to 2, 3, ..., N, the third input of the one-bit adder of j-th cell of the first multiplier array column being connected to the third output of (j−1)-th decoder of multiplier bits, J being equal to 2, 3, ..., N/2, wherein the sum output of the one-bit adder of the last cell of each multiplier array column is an output of the respective bit of a first summand vector of results of the calculation unit, the output of the multiplexer of the last cell of (q−1)-th multiplier array column q being output of q-th bit of a second summand vector of results of the calculation unit, being equal to 2, 3, ..., N, wherein a first bit of the second summand vector of results is connected to a third output of (N/2)-th decoder of the multiplier bits, wherein the second inverted input and the non inverted input of the AND gate are coupled to the inverted inputs of the first bit and the non inverted input of the AND gate and to the inverted inputs of the second bit of the shift register, the second data inputs of the one-bit partial product generation circuits of all cells of the first column of the multiplier array, the third inputs of one-bit adders of first cells of all multiplier array columns and the non inverted input of the first AND gate with the inverted input are coupled and connected to "0", wherein in each multiplier array cell, the output of the first trigger is connected to the data input of the second trigger, wherein the output is connected to the non inverted input of the AND gate with the inverted input and to a first data input of the one-bit partial product generation circuit, and wherein a third control input is connected to the second data input of the multiplexer, the first data input being connected to a carry output of the one-bit adder of the same cell of the multiplier array.

8. An adder circuit, comprising:

first and second AND gates having an inverted input;

a carry look-ahead circuit;

a half-adder; and an EXCLUSIVE OR gate in each of its N bits of the adder circuit, wherein an input of each bit of a first summand vector of the adder circuit and an input of a respective bit of a second summand vector of the adder circuit are connected respectively to first and second inputs of the half-adder of respective bit of the adder circuit, wherein a sum output is connected to a first input of the EXCLUSIVE OR gate of the same bit of the adder circuit, wherein an output is an output of the respective bit of a sum vector of the adder circuit, a second input of the EXCLUSIVE OR gate of a q-th bit of the adder circuit being connected to an output of a carry to q-th bit of the carry look-ahead circuit, q being equal to 2, 3, ..., N.

wherein an initial carry input and the second input of the EXCLUSIVE OR gate of the first bit of the adder circuit are connected to "0", wherein a sum output of the half-adder of each bit of the adder circuit is connected At to a non inverted input of the first AND gate with inverted input of the same bit of the adder circuit, wherein the output is connected to a carry propagation input through the respective bit of the carry look-ahead circuit, the carry output of the half-adder of each bit of the adder circuit being connected to a non inverted input of the second AND gate with the inverted input of the same bit of the adder circuit, and wherein the output is connected to a carry generation input of the respective bit of the carry look-ahead circuit, the inverted inputs of first and second AND gates with the inverted input of each bit of the adder circuit being coupled and connected to a respective input of a data boundaries setting for the summand vectors and sum vectors.

* * * * *